US012705453B2

(12) United States Patent
Edgar

(10) Patent No.: US 12,705,453 B2
(45) Date of Patent: Aug. 11, 2026

(54) SYSTEM, METHOD, AND COMPUTER PROGRAM PRODUCT FOR THE PRODUCTION AND CONSUMPTION OF NATURAL INTELLIGENCE USING AN ARTIFICIAL BRAIN

(71) Applicant: David Allan Edgar, Brentwood, MD (US)

(72) Inventor: David Allan Edgar, Brentwood, MD (US)

( * ) Notice: Subject to any disclaimer, the term of this patent is extended or adjusted under 35 U.S.C. 154(b) by 818 days.

(21) Appl. No.: 18/109,811

(22) Filed: Feb. 14, 2023

(65) Prior Publication Data

US 2023/0206081 A1 Jun. 29, 2023

Related U.S. Application Data

(63) Continuation-in-part of application No. 16/577,294, filed on Sep. 20, 2019, now Pat. No. 12,242,923.

(Continued)

(51) Int. Cl.
*G06N 3/004* (2023.01)
*G06N 3/063* (2023.01)

(Continued)

(52) U.S. Cl.
CPC ............. *G06N 3/004* (2013.01); *G06N 3/063* (2013.01); *G06N 3/10* (2013.01); *G06N 3/105* (2013.01);

(Continued)

(58) Field of Classification Search
CPC .......... G06N 3/004; G06N 3/063; G06N 3/10; G06N 3/105; G06N 7/06;

(Continued)

(56) References Cited

U.S. PATENT DOCUMENTS 10,176,382 B1 1/2019 Owechko et al.
2003/0097159 A1 * 5/2003 Schiff ..................... A61N 1/32 607/45

(Continued)

OTHER PUBLICATIONS

Rikhye et al., "Toward an Integrative Theory of Thalamic Function" Apr. 4, 2018, Annual Review of Neuroscience, pp. 163-183. (Year: 2018).*

(Continued)

*Primary Examiner* — Miranda M Huang
*Assistant Examiner* — Chase P. Hinckley

(57) ABSTRACT

Systems and methods are described herein which may be implemented using computer programs comprising instructions that replicate the neural synchronization based natural intelligence algorithm of the human brain. These implementations result in the production and consumption of naturally forming intelligence in a computer system or network. An embodiment of the invention comprises an artificial brain, further comprising a thalamic controller, motion reactor, motion translator, motion actuator, time-dilation memory, and cognitive object interface. Data is translated from original format into thalamic motion and further encoded with motion signal protocol, then reproduced for the purpose of sensory perception and aggregated through a process of thought production, thereby replicating the process of natural intelligence in a manner designed to dramatically improve current artificial intelligence standards. By duplicating the human brain's natural intelligence process, overall computer intelligence should approach or surpass human level intelligence in automation and adaptation ability.

21 Claims, 9 Drawing Sheets

Related U.S. Application Data

(60) Provisional application No. 62/734,443, filed on Sep. 21, 2018.

(51) Int. Cl.
*G06N 3/10* (2006.01)
*G06N 7/06* (2006.01)
*G06F 3/01* (2006.01)
*G06F 9/455* (2018.01)

(52) U.S. Cl.
CPC ..... *G06N 7/06* (2013.01); *G05B 2219/39292* (2013.01); *G05B 2219/39385* (2013.01); *G06F 3/015* (2013.01); *G06F 9/455* (2013.01); *G06T 2207/30016* (2013.01)

(58) Field of Classification Search
CPC .......... G05B 2219/39292; G05B 2219/39385; G06F 3/015; G06F 9/455; G06T 2207/30016
See application file for complete search history.

(56) References Cited

U.S. PATENT DOCUMENTS

| | | | | |
|---|---|---|---|---|
| 2009/0106007 | A1* | 4/2009 | Massaquoi | G06N 3/04 703/11 |
| 2009/0306741 | A1* | 12/2009 | Hogle | A61N 1/36103 600/595 |
| 2016/0004957 | A1* | 1/2016 | Solari | G06N 3/008 706/27 |
| 2020/0097832 | A1 | 3/2020 | Edgar | |
| 2022/0215267 | A1* | 7/2022 | Oster | G06N 3/0455 |
| 2023/0048571 | A1* | 2/2023 | Poltorak | G16H 70/60 |
| 2023/0093444 | A1* | 3/2023 | Zander | G06F 3/015 706/12 |
| 2023/0306244 | A1* | 9/2023 | Weng | G06N 3/044 |

OTHER PUBLICATIONS

Sukhoborov et al., "Consciousness and Subconsciousness as a Means of AGI's and Narrow AI's Integration" 2020, Springer, pp. 515-520. (Year: 2020).*

Dean et al., "Biological Blueprints for Next Generation AI Systems" Dec. 1, 2019, arXiv: 1912.00421v1, pp. 1-48. (Year: 2019).*

Qi et Wu, "Human-like machine thinking: Language guided imagination" Jun. 1, 2019, arXiv: 1905.07562v2, pp. 1-9. (Year: 2019).*

Komarovsky, Shimon, "Purposeful and Operation-based Cognitive System for AGI" Jan. 31, 2023, arXiv: 2301.13556v1, pp. 1-22. (Year: 2023).*

Ho, Seng-Beng, "A General Framework for the Representation of Function and Affordance: A Cognitive, Causal, and Grounded Approach, and a Step Toward AGI" Aug. 18, 2022, arXiv: 2206.05273v3, pp. 1-66. (Year: 2022).*

Alicea et Parent, "Meta-brain Models: biologically-inspired cognitive agents" Jun. 16, 2022, arXiv: 2109.11938v3, pp. 1-20. (Year: 2022).*

Wang et Halassa, "Thalamocortical contribution to solving credit assignment in neural systems" Apr. 3, 2021, arXiv: 2104.01474v1, pp. 1-27. (Year: 2021).*

Konar et al., A quantum bi-directional self organizing neural network (QBDSONN) architecture for binary object extraction from a noisy perspective, Applied Soft Computing, Sep. 2016, vol. 46, pp. 731-752.

Nicolas Riche, Vision: Video and Image Saliency Detection, Dissertation for PhD in Engineering Science, University of Mons, Nov. 4, 2015, 271 pp.

Tian et al., Authentication and copyright protection watermarking scheme for H.264 based on visual saliency and secret sharing, Multimed Tools Appl., vol. 74, 2015, pp. 2991-3011.

Yan et al., Video Encryption and Decryption on Quantum Computers, International Journal of Theoretical Physics, vol. 54, 2015, pp. 2893-2904.

Yan et al., Quantum image processing: A review of advances in its security technologies, International Journal of Quantum Information, vol. 15, No. 3, Apr. 3, 2017, pp. 1730001-1-173001-18.

* cited by examiner

Memory Unit ↔ Memory Unit ↔ Memory Unit ↔ Memory Unit

Memory Chain 707

SYSTEM, METHOD, AND COMPUTER PROGRAM PRODUCT FOR THE PRODUCTION AND CONSUMPTION OF NATURAL INTELLIGENCE USING AN ARTIFICIAL BRAIN

CROSS-REFERENCE TO RELATED APPLICATIONS

This application is a continuation-in-part of U.S. patent application Ser. No. 16,577,294, filed Sep. 20, 2019, which in turn claims benefit of priority of U.S. Prov. Pat. App. Ser. No. 62/734,443, filed Sep. 21, 2018, the contents of which are incorporated herein by reference.

STATEMENT REGARDING FEDERALLY SPONSORED RESEARCH OR DEVELOPMENT

The invention described herein was conceived without the benefit of federal funding.

BACKGROUND OF THE INVENTION

The present invention relates, generally, to computer networks and communication systems and artificial intelligence and, more particularly, to the transport and processing of computer data consisting of data records and data frames in computer networks and communication systems to use an artificial brain to produce a new form of artificial intelligence called natural intelligence.

The two biggest problems plaguing artificially produced computer intelligence are network bottlenecks and real-time adaptation. The bottleneck problem occurs when a burst of input or output overloads the existing network and computer interfaces. This creates an imbalance in the process where the IT capacity cannot satisfy the demand resulting in poor performance, excessive costs, and limited functionality. On its heels rests the analytics problem which is the ability to process the data, adapt to unknown, and make decisions in real-time. Current methods are too slow, prone to failure, and cannot cost-effectively scale. This severely restricts their value and use in duplicating human-level intelligence.

Attempts to solve the bottleneck problem use a variety of techniques. The most common method is compression. A compression algorithm removes repeated byte patterns from the data payload. While compression may reduce individual payloads by 10% to 40%, it does nothing to reduce the number of data packets. So, "10,000 sensors still send 10,000 packets, just slightly smaller ones". Failure to solve the problem has forced the industry to either upgrade capacity or downgrade capability.

While data bottlenecks have existed since the inception of computers and computer networks, the requirements of sensor processing and artificial intelligence have exacerbated this issue. Where companies may have 2,000 human users producing transactions every couple of minutes for 8 hours a day, now they have 10,000 sensors producing transactions every few seconds for 24 hours a day. The human users produce 480,000 transactions, while the sensor system produces 432,000,000 transactions that must be processed by some form of artificial intelligence. World-wide computer/network capacity is not currently or near-term capable of satisfying such escalation requirements.

Current industry initiatives to produce artificial intelligence (AI) from machine intelligence to deep-learning, all suffer from the same recognized problem. They are manifestations of "narrow intelligence." These systems are only capable of solving specific problems where all the variables are known. For example, Machine Learning is where computers use a statistician's toolset, such as regression analysis, to examine large data sets. This is to draw inferences over the long term for the human supervisor to act on. Deep Learning is an expansion of Machine Learning, where apps are capable of scanning unstructured data input, like images, text docs, and speech patterns, to perform basic recognition and then action. These AI approaches have a large weakness: they cannot adapt to what they do not know. If current AI does not have previous experience to a change in the environment, then it cannot make a decision.

The AI industry recognizes the shortcomings of these approaches and theorizes that the solution can only be found in what is called "Artificial General Intelligence" (AGI). However, very little is known on how such a system should be designed or constructed. The industry therefore continues to provide more hardware capacity into "narrow intelligence" in a mistaken belief that all data patterns can be preprogramed and General Intelligence can emerge. Attempting solutions in this manner runs into the same bottleneck problem identified above except with frightening capacity escalation requirements.

Both problems in intelligence production are rooted in the industry's failure to identify the brain's natural algorithm for data processing and intelligence production. What the brain can do in an instant is well beyond their capabilities. The brain's algorithm represents the most evolved method for producing and consuming intelligence in nature. Tapping into this natural process will solve many of the current roadblocks, paradoxes, and dead ends that are currently stifling industry advancement. To mimic its functionality is to follow a blueprint that stretches back to the very beginning of life.

Neural Synchronization

Life is by its own nature impaled on the "arrow of time". All lifeforms must be consciously aware of the passage of time. It is part of the biological process and sits as a fundamental definition of what it means to be alive. All lifeforms achieve a conscious state through perception of their environment using sensory systems. This perception is accomplished through a rhythmic measurement of space. A biological process maintains state by performing and applying these measurements based on a linear time cycle. Since there exist no world clock (Einstein), the rhythm is set by each individual lifeform and measured relative to that lifeform (observer). So, existence is based on sensory measurements of 3-dimensional space relative to the time of observation.

In the human brain, time relativity is calibrated through the hypothalamus, which uses the optic charisma like a stellar pulsar to establish a circadian rhythm that regulates the cycling of the biological process. By performing this function, the hypothalamus serializes/sequences sensory input and synchronizes the execution of both the left and right brain hemispheres through timing connections.

Each brain hemisphere is individually controlled by the thalamus. The thalamus cycles the linear firing sequence using a sophisticated set of nuclei internally sequenced. More importantly, the thalamus maintains a state of neural synchronization between itself and all the lobes, cortexes, and layers through these nuclei. The reason why most thalamic connections are reciprocal is because two-way communication is mandatory to maintain a synchronous state. Neural synchronization allows the brain to exist in a single entangled state as sensory measurements are cycled, processed, and applied.

All sensory data arrives asynchronously. The brain does not control or synchronize the timing of the sensory observation points. Since there are many different types of sensory systems that all generate data at different intervals, the brain will not waste energy or capacity synchronizing sensory data production. Instead, the thalamus provides a bridge for all the asynchronous sensory data to enter into the brain's synchronous state.

Since the thalamus understands the passage of time given to it by the hypothalamus, each of its individual nuclei can maintain state. The thalamus uses timed measurement intervals to translate all sensory data into flat space-time (Minkowski). Basically, a single slice of reality. Comparing the slice of space-time against a synchronized state allows the thalamus to produce a measurement of thalamic motion. Thalamic motion is actually a set of instructions on how to change state and it does not matter what sensory or object format is being measured. A downstream component simply applies these instructions to keep the states synchronized in real-time.

When the thalamus conducts the measurement, it will detect changes/movements in state and will categorize any detected motion as either predictable, or unpredictable. Unpredictable states are accumulated, and their change instructions are encoded for synchronization. Predictable states are discarded because their results are already known by the downstream component due to its shared state with thalamus. The knowledge is passed between components by the sheer existence of the timed neural pulse. By discarding predictable motion states, the brain achieves incredible transmission efficiency and response time between its synchronized components.

The thalamus distributes thalamic motion in two directions. The first path is for sensory perception and the second path is for thought production. Since raw sensory perception requires no further refinement, it can be synchronized directly to the state maintained in the prefrontal cortex through a sensory perception binding point. The prefrontal cortex maintains a state within the brain that can be described as the state of conscious reality. Human consciousness perceives and responds to the state that is maintained in the prefrontal cortex. The prefrontal cortex is the end point for both sensory perception and thought production which are synchronized (bound) at different points within the hypothalamic/thalamic cycle.

The second direction for thalamic motion is thought production. Before a thought can be produced, it must go through a system of natural intelligence production. The production process converts sensory data into cognitive objects for identification, interpretation, and subsequent reaction. The thalamus is responsible for coordinating the firing sequence of all the higher levels that will be executed by the different lobes of the brain, including the occipital lobe, parietal lobe, and the temporal lobe. At all levels, the thalamus will maintain state for that level and share it with the connected component/lobe layer through synchronous connections. By doing this, the thalamus creates a structured single state shared in by all of its biological components.

Neural Synchronization conquers the basic physics necessary for the different processes in the brain to exist and function together. Time is nothing more than the measurement cycle of the observer and the length of that cycle creates time relativity. In the brain there are different processes and therefore different observers. These different processes experience time at different rates. A sensory system such as the eyes cycles measurement around 33 milliseconds, the conscious process of the frontal lobe cycles at 300 milliseconds, and the subconscious process of the thalamus cycles at 5 milliseconds. Thus, three different observers experiencing time differently.

To bridge observers, the thalamus which is the fastest of the processes maintains a synchronous state and entangles the different components of the brain's physical process. The entanglements form a synchronous cohesion between the brain components allowing them to share the same state and execute in the same measurement cycle. The thalamus uses the shared state to control the firing sequence of the brain's linear subconscious process. Sharing state also allows the brain to cheat on the amount of sensory data that must be exchanged between components. Only unpredictable motion is transferred through the synchronous state because predictable motion already exists in the shared framework. The brain's synchronous subconscious process is entirely based on energy conservation where prediction regulates energy usage.

So, the eyes every 33 milliseconds dump their sensory data into the thalamus. The thalamus is going to perform a motion measurement to identify the unpredictable motion in the sensory data. The thalamus conducts it measurement based on the original observation time of the sensory system (33 ms), not its own process time (5 ms). This creates a data payload of synchronous motion that preserves the original sensory observation. Basically, a frozen moment in time (Flat 4D). The single moment in time can then be processed through the single state maintained by the synchronous process. Other processes such as consciousness (300 ms) can interface with the synchronous state to generate awareness of that moment.

Now, synchronous data traveling through a separate faster synchronous process creates a theoretical time tunnel where observation time is tunneled through the synchronous process and is reproduced on the other side in the original time-relativity. The synchronous process eliminates time dilation by simply removing itself out of the equation so that its own process time does not alter the experience. To the original observer, the measurement appears to be instantaneous, but in the thalamus, a linear subconscious process generating sensory perception and thought production is being executed. It is all occurring in the time available because other observation times are slower than thalamic measurement time.

For life to exist in the physical universe requires a linear measurement process, it hides itself by operating at a faster time relativity. All life down to single cells measure and communicate sensory data using some form of this energy conservation technique. Its prediction-based architecture is the bedrock to understanding what comes next and where the process of Natural Intelligence begins.

Natural Intelligence

The Process of Natural Intelligence is a highly efficient evolved method for turning sensory data into a state of awareness so physical life can automate activity and make adaptations to survive. Within it is an understanding of the passage of time and a sensory picture of the environment relative to the biological life-form. Life is a physical process whose primary function is to measure its own existence. This measurement is fundamental to its secondary function which is to preserve that existence. Life's sense of self-preservation is woven into the tapestry of evolution and drives life to adapt to a changing environment.

The goal of all life is survival. Natural intelligence evolved as a process to utilize prediction to perpetuate the state of the biological process. Prediction gives life the greatest chance of success and is the most important low-level primitive in all biological lifeforms. Life survives and evolves through the production of Natural Intelligence and its ability to automate deterministic activity while adapting to a non-deterministic environment.

The brain requires two different processes, one subconscious and one conscious that work together to produce and consume Natural Intelligence. The primary process of the brain is the subconscious system which maintains the state of the physical biological organism. It consumes over 99% of the brain's energy expenditure processing sensory data, generating awareness, and automating activity. The subconscious process filters out non-deterministic sensory motion in order to optimize deterministic reactions. The deterministic nature of the subconscious precludes adaption which is the function of the conscious process. The conscious process has access to long-term memory and can rationalize and make new decisions. The two processes of the brain are symbiotic, yet distinct in their language, understanding, and function. One has a preset known view of the environment and the other can exceed the sum of its parts to understand change. Together they create a single life-form capable of high-speed repetitive function and slower-speed adaptation.

The human brain is the most highly evolved, energy efficient system for extracting naturally forming intelligence to feed its biological needs. The brain starts as an empty shell. But, within it is a powerful Natural Intelligence algorithm that combines a subconscious process with a conscious process to turn sensory perception into awareness into thought and ultimately into automation. Natural Intelligence is a self-perpetuating process that feeds off of its previous experience to automate activity to maximize its chances of survival.

One Brain, Two Systems

The Natural Intelligence process of the brain has two independent systems, one subconscious and one conscious. The subconscious executes the physical components that constitute life and the biological process. The conscious process sits on top of this framework and is responsible for decision-making, rationalization, learning, and adapting. The different systems use two different forms of intelligence to perform their respective functions, consciousness uses symbolic intelligence and the subconscious runs on general intelligence. The two system together create a Natural Intelligence process that integrates a top-down understanding of the sensory experience with a bottom-up understanding of its implementation.

In the brain, the thalamus processes the sensory data into two data streams, one destined for Sensory Perception and the other for Thought Production. This separation has the following benefits:

It prevents thought production from interfering with sensory perception by creating two independent binding points in the prefrontal cortex.

It is highly efficient in that raw sensory data (sensory perception) only travels a half brain length to bind as opposed to traveling to the back of the brain and then to the front.

It prevents infinite regression by forcing thought production into a subsequent cycle of sensory perception.

To facilitate sensory perception binding requires that all sensory data be consolidated into a single format so that it can be transmitted to the prefrontal cortex. Current neurology believes this consolidation occurs as part of the temporal lobe process. Unfortunately, the temporal lobe fires far too late in the Thought Production cycle to consolidate sensory perception. To make the sensory binding point, all sensory data must be consolidated before Thought Production begins.

In the thalamus, the pulvinar nucleus controls the cycling of all the different sensory system including the Lateral Geniculate Nucleus (LGN). The pulvinar is in the correct position in the biological process to consolidate the different sensor modalities. Since sensory data creates its own state, the format is irrelevant to the pulvinar. However, to merge data requires that the pulvinar normalize the format. This is accomplished by using general intelligence to group sensory data into globs and globular clusters. A glob is an initial grouping of sensory data and produces basic objectification. Globs can be associated with other globs to form globular clusters. The pulvinar uses only object boundary intelligence to organize raw sensory data into globs. The glob is the data format of general intelligence and allows sensory data to be combined into a universal format that enables agnostic communication and memory storage throughout the brain.

Combining all sensory data before Thought Production also provides the brain's process with many advantages. First of all, it allows the other sensor modalities to piggyback on the visual stream's time sequencing, essentially allowing all sensory data to be associated to the same moment in time before thalamic motion is measured. The measurement produces thalamic motion that will be synchronized to the prefrontal cortex in the case of Sensory Perception and the primary visual cortex V1 in the case of Thought Production.

Once in the primary visual cortex V1, the occipital lobe V2 will map the globs or globular clusters to symbols and occipital lobe V3 will map the symbols to associations. The two formats are then encoded into a single memory construct in occipital lobe V4. General intelligence and Symbolic Intelligence can only exist together in memory; otherwise, the two formats are incompatible.

The following table summarizes the characteristics of the brain's subconscious and conscious processes:

| | Subconscious | Conscious |
|---|---|---|
| Nature | Deterministic | Non-Deterministic |
| Data Format | Globs | Symbols |
| Execution | Synchronous | Asynchronous |
| Function | Automation | Adaptation |
| Response Time | Real-Time + | Unknown |
| Motion Responsibility | Predictable | Unpredictable |
| Intelligence | General | Symbolic |
| Object Knowledge Level | Border Only | Contents |
| Knowledge Structure | Flat | Hierarchical |
| Analytics | Bottom Up | Top Down |

Combining all sensory data into a single format and feeding it into the occipital lobe defines the first phase of Thought Production. By sending all forms of sensory data through the occipital lobe, the brain uses the visual processing system to convert the general intelligence to symbolic intelligence. In the brain, the interpretation of all sensory data is based on a visual process. So, whether it is a sound or a tactile feeling, all are represented to consciousness as some combination of visual symbols. Humans are creatures of visual sight and it dictates the symbolic language of the conscious state.

Symbolic Intelligence

The first step in Thought Production occurs in the primary visual cortex (V1) of the occipital lobe. Since the lateral geniculate nucleus of the thalamus has consolidated all sensory data, what ends up stored in primary visual cortex (V1) is the unpredictable sensory elements of a single moment in time. At this level of Thought Production, the primary visual cortex V1 is filled with just globs and globular clusters that carry their own state. The occipital lobe's function is to map these globs with symbolic intelligence in order to form subconscious awareness that can eventually produce either subconscious reactions or awareness to the conscious state.

The lower occipital lobe (V1 thru V4) which provides the translation function where globs in V1 can be matched to symbols in V2, assigned associations in V3, and formed into memory in V4. This framework provides a non-evasive bridge between the language of the conscious state and the globs of the subconscious. The lower occipital (V1 thru V4) allows globs, symbols, and associations to be grouped together for advanced processing, pattern recognition, and memory storage. The layered separation allows the subconscious to use the product of conscious reasoning without the need to understand the details. The subconscious only sees globs and consciousness only sees symbols.

The occipital lobe V2 is where the symbolic mapping function begins. Symbols are loaded either by previous cycle memory or by an executive directive (consciousness). Symbols are a hierarchical language used by the conscious state to perform reasoning and decision-making functions. The pulvinar of the thalamus will synchronize the current selected set of activity symbols with occipital lobe V2. The V2 state is maintained by aligning the symbol memory tissue in a defined order to match the globs in V1.

V2 is the first level where identification of the contents of the glob is performed. The matching of a glob to a symbol is dependent on previous experience memory originally stored by the conscious state. So, hypothetically, 5000 different sensory signals (50 data globs) may now be represented in conscious thought as a single finger symbol. In the finger symbol, the brain has consolidated and translated all related sensory data into a single symbolic element. Higher intelligence is based on the ability to create, abstract, and associates these symbols so knowledge can be organized for memory storage and eventually rationalization.

V3 is where symbols are associated. After V2, the pulvinar will synchronously trigger V3 with a set of association symbols. These symbols form the context of the activity. The brain organizes and loads reactions based on a given task or general activity. So, the hand has one set of reactions for holding a baby and completely different set for swinging a hammer. The V3 symbols are functionally indexes for cross referencing short-term and long-term memory. These associations allow the subconscious to categorize unpredictable motion with a general symbolic understanding of the sensory event.

V2 and V3 of the occipital lobe is also the focus level where executive directives from the frontal lobe (consciousness) direct organization. So, if cognitive focus is on a hand, the group symbol for hand may be used. Assuming 10,000 senses for the rest of the hand, 35,000 senses (350 data globs) are now represented by a single symbol. More practically, if one is focused on the road while driving, all the motion outside of that focus will be filtered out of thought production. Cognitive focus allows the brain to reorganize all sensory data on-the-fly and enables a filtration system that can be used to balance energy usage in the lower brain.

As the brains cycles, unpredictable sensory thalamic motion is continually feed into primary visual cortex (V1) from the LGN. The thalamic motion of globs has two possible states, predictable and unpredictable. The primary visual cortex (V1) only processes unpredictable glob motion. All reactions for predictable glob motion bypass the occipital lobe and will be executed automatically by other components of the brain's subconscious process. When an unpredictable glob is encountered, the subconscious lacks the intelligence to understand it, let alone figure it out. The subconscious cannot rationalize, create, or consciously think in any way. It is completely deterministic where every action must be known ahead of time. The lower occipital lobe (V1 thru V4) provides the brain with the means to sort out what it does not know.

The primary purpose of the lower occipital lobe is to translate globs that are exhibiting unpredictable motion and prepare them for searching memory. Memory is the only place in the brain where general intelligence and symbolic intelligence can coexist; otherwise, the biological languages are incomprehensible. To begin construction of the needed memory, V4 of the occipital lobe accumulates the unpredictable motion globs from V1, the symbols assigned in V2, and the associations from V3 to form a single memory object that can be sent up the ventral stream where it can be processed by the temporal lobe to search memory. This single flat memory construct has distilled in it all the raw data, symbols, associations, and general spatial motion for unpredictable objects in 3-dimensional space.

The Subconscious Process

Some estimates suggest that the brain processes 11 million bits of sensory data per second, yet the conscious mind is only capable of processing 50 bits per second. Others like Dr. Joseph Dispenza, DC suggest, "The brain processes 400 Billion bits of information a second. BUT, we are ONLY aware of 2,000 of those".

While consciousness guides many reactions, it clearly does not have the capacity to either perform the reactions or process the results. This is beyond its ability and its role in the biological process. The conscious state is ill-suited to process the massive amount of data the brain receives every second, let alone perform the millions of physical reactions required to perform simple activities such as walking a dog or riding a bike. Since consciousness is not functionally capable, the subconscious process is used to perform and monitor reactions. These reactions are executed automatically without access to the conscious state. The subconscious reaction is the hallmark of life and has evolved to perform all the reactions required by the biological process. There is no such thing as a conscious reaction, all reactions are performed subconsciously.

The primary components of the subconscious process of the brain where sensory data is turned into Thought Production and eventually into subconscious reactions. As previously explained, the lower occipital lobe combines general intelligence with symbolic intelligence to create memory associated with unpredictable thalamic motion. This is the first stage of Thought Production and once complete, the memory will be sent across the ventral stream to the temporal lobe.

In the temporal lobe, the amygdala uses the ventral stream data to format a search request using a combination of the globs (V1), symbols (V2), and associations (V3) to identify the unpredictable motion pattern in previous memory experiences. In the brain, the amygdala functions as a search engine providing access to both short and long-term memory. For the subconscious search, the amygdala is restricted to accessing only memory in the hippo-campus which holds short-term active memory. Since the amygdala is being accessed inside of the synchronous state, it cannot access asynchronous long-term memory. To do so would collapse the timing of the neural synchronous cycle causing the brain to stall out of real-time.

The amygdala will return all search results with the corresponding actions to the motion cortex (MT). The motion cortex (MT) is responsible for correlating all the actions necessary for creating new subconscious reactions. The selection process will begin by processing all the short-term memory search results coming from the amygdala. Unfortunately, searching memory has no guarantee of results. To resolve failed search attempts, the motion cortex will process the primitive visual stream (rods-only) from the superior colliculus combined with the emotional state of the biological process to make the appropriate choices. Basically, if memory does not provide resolution to the unpredictable motion, the subconscious process may step in and produce a reaction to preserve the biological process (life). These reactions are primal and instinctual and often do not reflect conscious selections. The motion cortex (MT) finalizes and transfers the selection of new actions to the occipital lobe V6 and V6A for distribution through the dorsal stream for final delivery in the premotor cortex of the parietal lobe.

The basal ganglia is the central control point for managing both new actions for unpredictable motion arriving in the premotor cortex and existing actions for predicted motion drawn from previous experience stored in the cerebellum. The basal ganglia sorts through all the new actions requested and sends them to the motor cortex for execution. All decisions regarding these actions are known and therefore can be performed subconsciously.

The basal ganglia also receives a copy of the unpredictable thalamic motion from the primary visual cortex (V1). Any unpredictable motion not resolved by new actions will enable the basal ganglia to modulate all affected predicted motion actions. Basically, modulation starts, stops, increases, or decreases action potential for each predicted action processed by the motor cortex. The motor cortex produces the final subconscious reactions out of these actions but is not responsible for measuring or understanding the results. This is what makes a subconscious reaction unique. A subconscious reaction success or failure will be based on the sensory data that the action produces and will be measured by the thalamus in subsequent neural cycles. By doing it this way, the brain can produce a subconscious reaction that requires no access to symbolic intelligence which means no access to consciousness is mandated.

All remaining unpredictable motion not resolved either through new actions or modulation will be processed by the basal ganglia through the somatosensory cortex of the parietal lobe. The somatosensory cortex is responsible for recording the memory of the experience to complete the Thought Production process. An experience is encoded into the brain based on the ratio between sensory measurement and cognitive measurement. In the human brain, the eyes cycle (sensory measurement) around 33 milliseconds and the frontal lobe (cognitive measurement) cycles around 300 milliseconds. This equates to a 9-to-1 ratio between sensory and cognitive measurement. As a result, the somatosensory cortex will accumulate 9 sensory moments in time to store a single cognitive experience. Each sensory moment in time will contain general intelligence, symbolic intelligence, motor actions, and emotions. When bond together they create a single uniquely patterned experience that is the final product of thought production and will be transferred to consciousness.

Each unique experience produced by the somatosensory cortex becomes automatically linked to the previous experience which forms a memory chain. As more experiences are accumulated, the subconscious process eventually has access to memory chains that contain all the predicted sensory states and motor responses to those states. Using this memory structure, the subconscious process automatically feeds the action predictions to the motor cortex and sensory predictions to the thalamus. This self-perpetuating process enables the brain to operate faster than real-time where at a minimum it is predicting 9 sensory and action states into the future which is required due to the time differential between sensory measurement and cognitive measurement.

The Consciousness Process

Neural synchronization and the General Intelligence framework of the brain provides the basis for creating a completely automated system for performing real-time reactions to a sensory based environment. While wonderfully efficient, the process is solely dependent on that which is known and predictable (deterministic). Unfortunately, life exists in a non-deterministic environment and past genetic instructions, the brain starts empty. To resolve this problem, the brain needs an additional component capable of performing reasoning outside of the synchronous process. In the brain, this additional process is performed by the frontal lobe where consciousness is maintained. The frontal lobe has its own cycle, its own state, and runs asynchronous to the brain's neural synchronous process.

A natural byproduct of the neural synchronous process is a basic understanding of time and space. The brain manifests this understanding as a state of reality by binding Sensory Perception and Thought Production into the prefrontal cortex as part of the hypothalamic/thalamic cycle. When the asynchronous state of the frontal lobe interfaces with the synchronous state of the prefrontal cortex, it creates sensory awareness of the environment. With the awareness, consciousness can fulfil its primary function which is to create reactions to adapt to that environment. So, whether one is a monkey finding a banana or a rocket scientist building the next space shuttle, to the brain's biological process it is all the same, a process of general intelligence. Only consciousness which uses symbolic intelligence can understand the distinction between the activities and create new reactions.

The frontal lobe (conscious process) is a separate process that interacts with the brain's subconscious process to create awareness. The subconscious process starts when sensory data is feed into the thalami. Each thalamus will measure the sensory data and convert it into thalamic motion. The thalamic motion transmitted directly to the prefrontal cortex is for Sensory Perception. Thalamic motion transmitted to the occipital lobe is for Thought Production. To produce thoughts requires that the sensory motion be translated to symbolic motion in the occipital lobe and run through the parietal lobe for motor actions and final correlation before being delivered through the hypothalamus to the prefrontal cortex. The two Sensory Perception data streams mixed with the Thought Production data stream produce awareness of the environment and oneself.

Using the awareness, the conscious process of the frontal lobe can create symbols, make associations, focus awareness, access long-term memory, rationalize top-down, and generate reactions. The frontal lobe is able to perform these functions based on the experience accumulated during the lifetime of the biological process. Previous experiences allow the biological life-form to acclimate its decision-making style based on the environment in which it lives by teaching the subconscious process of the brain how to adapt.

The conscious process of the human brain has very limited capacity. While it has the ability to make action selections, it cannot execute those actions or monitor their results. At best, it can examine small slices at a time using its cognitive focus capability. Focusing allows the conscious state to magnify specific areas of the subconscious state in order to formulate more precise reactions. In the brain's biological process, there is no such thing as a conscious reaction. The hippo-campus (short-term memory) is the interchange point to feed conscious selections into the subconscious process. This is the reason why memory is dormant in the prefrontal cortex and active in the hippocampus. Memory is the only place where both general intelligence and symbolic intelligence can exist together.

This technique allows data interchange and ensures that the conscious state never interferes with the function of the subconscious process. All conscious selected reactions are retrieved and executed automatically as part of the subconscious process. During the next thalamic cycle, the occipital lobe will find this memory and queue the reactions for transport through the dorsal stream for execution by the parietal lobe. The subconscious state must manage all of it, regardless of what the conscious state is doing. The subconscious manages and runs the physical process and when needed will harvest intelligence from consciousness to fulfil that goal.

Emotions in Natural Intelligence

Unfortunately, the separation of language in the brain's process creates a serious problem. The subconscious state has no concept of symbols, so it has no references from which to understand how consciousness uses symbolic intelligence to form decisions. In a like manner, consciousness can only see symbols and has no understanding of how the globs are processed at the physical level. The result is that the conscious and subconscious processes of the brain have no common language through which to communicate. To solve the language problem, the biological process uses a separate more basic form for communication. It uses rewards such as dopamine release and punishments such as pain to encourage or discourage conscious behavior. The brain also uses emotions to alter the context of both the conscious and subconscious state to influence decision-making. This form of communication can indirectly bridge between general (subconscious) and symbolic (conscious) intelligence.

The brain's goal is simple, process sensory awareness to create reactions that preserve the biological process. The conscious state is given a sensory picture, a symbolic breakdown, and awareness of the passage of time. The subconscious expects to be feed reactions that generate successful predictions to fuel its automation process. The predictions are used by the subconscious process to monitor the health of the biological process. If these predictions are not forthcoming, the biological process will react.

The brain monitors and measures the success of consciousness via the amygdala in the temporal lobe. The amygdala is responsible for searching short and long-term memory. There is a direct correlation between search success rates and the success of conscious intelligence in satisfying its purpose in the biological process. The amygdala maintains a count of the number of search requests sent and the number of requests satisfied. The ratio between these two counts allows the amygdala to keep taps on the prediction success of the biological process.

A high subconscious search success rate in the amygdala is an indication that motion patterns are being matched to reactions and predictions are available to the biological process. A low search success rate is an indication that the biological life-form is in danger and is expending too much energy in the lower brain. Without predictions, energy usage rises as the unpredictable data globs require more resources in the geniculate, occipital lobe, ventral stream, and hippocampus. The additional processing requirements will create a shift in the energy signature of the brain. As more energy is required to resolve the unpredictable motion, less energy is available to the higher levels. The energy signature begins to resemble more of an animal than a human where lower prediction levels create excess activity in the lower brain. Failure to predict is a threat to survival and the amygdala will create an emotion to preserve the biological process. That emotion is FEAR and it will be placed in the feedback for both the motion cortex (MT) and the hypothalamus.

The hypothalamus produces physical reactions based on the emotional state provided in the feedback coming from the amygdala. The feedback has been placed in the thought binding process which is the point where asynchronous thought production must be sequenced before synchronization into the prefrontal cortex. Certain thoughts carry with them emotional reactions which constitute physical reactions that must be performed by the hypothalamus. The hypothalamus has direct access to the pituitary gland and brain stem among other things and will execute the physical reactions that are associated with the emotion(s).

For FEAR, the hypothalamus may raise the body temperature which could manifest as sweating. It could lower the temperature which could cause the body to start shaking. At this level, emotions are simply commands to alter the physical state. The emotions themselves cannot be bound to the prefrontal cortex because there is no cognitive translation. Instead, the subconscious alters the physical state in an attempt to communicate. When failure to predict occurs, other emotions may also be mixed with FEAR. The search results in the amygdala may be low, but the symbols and associations indexed in the occipital lobe can match other related memory that generates additional emotions in the amygdala. These emotions are also scaled by the amygdala and repeated access to this memory is used to set the intensity of the emotion.

Over in the occipital lobe, the motion cortex (MT) also receives emotions in the feedback from the amygdala. Repeated failed search attempts have produced a state of FEAR and possibly other emotions. Conscious (symbolic) intelligence has failed to produce a reaction for one or more unpredictable motion objects. The motion cortex (MT) must now step in and use the emotions as a template for selecting a subconscious reaction to preserve the biological process. These are the primal reactions associated with basic animal behavior. An animal may begin to run in the opposite direction of the object, while another similar animal with an additional maternal instinct may step towards the object. Without higher reasoning, the biological process is forced to make the best animal reaction available based on the emotional state to restore prediction levels and survive.

In the case of too much unpredictable motion overloading the brain's process, cognitive focus can be set by the conscious process. The frontal lobe can set associations in occipital lobe V3 and focus symbols in occipital lobe V2. By setting associations, humans can generate other emotions that will alter subconscious decision-making for unpredictable objects. By focusing symbols, the occipital lobe can act as a filter to restrict the amount of unpredictable sensory motion, the prediction level will naturally rise in the amygdala with a corresponding reduction in FEAR intensity.

Focusing also helps restore the energy signature of the brain by reducing excess use of the occipital lobe and hippocampus.

The nature of general intelligence is to preserve the biological process, while the nature of symbolic intelligence is to provide reactions to fuel that process. The subconscious allows us to live while consciousness allows us to adapt. Together they form a Natural Intelligence process that form the cornerstones of survival and evolution.

Thus, notwithstanding the available hardware solutions, transport software implementations, architectures, and middleware, there is a need for a system, method, and computer program product that provides a better form of producing artificial intelligence using an artificially constructed brain. Further, there is a need for a processing system, method, and computer program product that provides such a better form of producing artificial intelligence using an artificial brain, (1) that can produce and consume natural intelligence using prediction-based memory, (2) that can map general intelligence to symbolic intelligence to action requests to automate motor controls, sensory perception and thought production, (3) that is highly scalable, extensible, and flexible, (4) that can seamlessly integrate with any hardware platform, operating system, and any desktop and enterprise application, (5) that can seamlessly integrate with any data record/frame protocol, (6) that can be implemented on any wired or wireless communication medium, (7) that can be used to create human-level artificial intelligence and neural interfaces, (8) and that can eliminate over 99% of existing data record/frame communication and processing requirements.

SUMMARY OF THE INVENTION

The primary object of the present invention is to overcome the deficiencies of the prior art described above by providing a system, method, and computer program product that can utilize a neural synchronization architecture to produce and consume natural intelligence to create an artificial brain.

Another key object of the present invention is to provide a system, method, and computer program product that can translate thalamic motion into symbolic motion to produce user awareness of a sensory-based environment.

Still another key object of the present invention is to provide a system, method, and computer program product that can translate thalamic motion into symbolic motion into motor actions to power motor controls using faster than real-time self-perpetuating automation.

Yet another key object of the present invention is to provide a system, method, and computer program product that can substantially increase the performance and the end-to-end response time in communication systems, computer networks, neural interfaces and artificial intelligence applications that utilize those systems and networks to achieve real-time operation.

Still another key object of the present invention is to provide a system, method, and computer program product that allows for the conversion of all computer data records/frames to thalamic motion and to use that thalamic motion to control the execution sequence of a plurality of computer processes that create an artificial brain.

Still another key object of the present invention to provide a system, method, and computer program product that implements a bottom-up subconscious process integrated with a top-down conscious process where the two processes communicate using a system of emotion-based variables.

It is yet another object of the present invention to provide a system, method, and computer program product that translates general intelligence to symbolic intelligence and consolidates the two forms of intelligence into a single shared memory construct that can used to sequence sensory prediction and search computer memory.

Yet another object of the present invention is to provide a system, method, and computer program product that provides primitive animal input and cognitive reasoning input to create action selections based upon the overall emotional state of the system and the search success rate in identifying unpredictable thalamic motion in shared memory.

It is a further object of the present invention to provide a system, method, and computer program product that can modulate slower motor controls as part of a faster neural synchronous process assigning new actions and automatically loading predictable actions.

Another key object of the present invention is to provide a system, method, and computer program product that uses the time-dilation between sensory measurement and cognitive measurement to concatenate multiple sensory measurements into a single cognitive experience using time-dilation memory that contains general intelligence, symbolic intelligence, motor actions, and emotional variables.

Yet another object of the present invention is to provide a system, method, and computer program product that provides a bridge between the neural synchronous subconscious process and a slower conscious process that is capable of accepting sensory perception and thought production to produce awareness.

It is a further object of the present invention to provide a system, method, and computer program product that creates a cognitive user interface that forms a symbolic alignment with the human brain allowing a user to control and instruct the artificial brain.

Another key object of the present invention is to provide a system, method, and computer program product that duplications the architecture of the human brain in order to create a process of natural intelligence that can create sensory awareness, automate predictable actions, and adapt to an unpredictable environment.

The present invention achieves these objects and others by providing a system, method, and computer program product that implements an artificial brain using a neural synchronization framework to create a process of naturally forming intelligence similar to the human brain, the system comprising one or more computer devices running a thalamic controller application module sequencing multiple motion decimator application modules to convert sensory data into thalamic motion, and a motion reactor application module that forms the neural synchronous framework, a motion translator module for mapping general intelligence to symbolic intelligence and selecting actions for unpredictable thalamic motion, a motion actuator module for modulating new actions and predicted actions to automate motor controls and create cognitive experience memory by combining sensory measurements into time-dilation memory, and a cognitive object interface module for interfacing with the artificial brain. The thalamic controller application, the motion translator application, the motion actuator application, and the cognitive object interface application are integrated on one or more motion reactor applications are adapted to synchronously communicate through wired and wireless means in a computer network or communications system. A thalamic controller application sequences one or more motion decimation application modules is the means through which computer data comprising data records and data frames, such as data produced by computer network devices like sensors and data repositories like relational databases, is translated from its original format into thalamic motion and further encoded with motion signal protocol (MSP) format for reduced, optimized, secured, and accelerated transport to a motion reactor application module. A motion decimation application module also receives synchronous reply data from a motion reactor application and translates the received data to motion synchronization commands and configuration requests. A motion reactor module performs the functions of receiving thalamic motion data from a motion decimation application and sending reply prediction data back to the motion decimator application. A motion translator module performs the function of mapping thalamic motion to symbolic motion to new action requests. The motion actuator application performs the function of using thalamic motion and symbolic motion and action requests to modulate and automate the execution of a motor control module. The cognitive object interface application allows a human user or artificial intelligence program to fulfil the functional requirements of consciousness to learn, adapt, and survive in an unpredictable environment.

The thalamic controller application module in coordination with the motion reactor application module implement a neural synchronization processing framework capable of integrating a motion translator application module with a motion actuator application module with a cognitive object interface application module to implement the circular process of Natural Intelligence and produce an artificial brain.

Further features and advantages of the present invention, as well as the structure and operation of various embodiments of the present invention, are described in detail below with reference to the accompanying drawings.

DETAILED DESCRIPTION OF THE INVENTION

In the following description, for purposes of explanation and not limitation, specific details are set forth, such as particular networks, communication systems, computers, terminals, devices, components, techniques, data and network protocols, software products and systems, enterprise applications, operating systems, enterprise technologies, middleware, development interfaces, hardware, etc. in order to provide a thorough understanding of the present invention. However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, enterprise applications, operating systems, enterprise technologies, middleware, development interfaces, and hardware are omitted so as not to obscure the description of the present invention.

The design of the software for the system, method, and computer program product of the present invention takes a novel approach based upon duplicating the human brain's neurological synchronization algorithm. The system, method, and computer program product of the present invention reduces, optimizes, secures, and accelerates the transport and processing of data records/frames in communication systems and computer networks through the use of thalamic motion. By encoding an object's thalamic motion, the system, method, and computer program product of the present invention reduces standard data record/frame communication resource requirements by over 99%. The system, method, and computer program product of the present invention uses Motion Signal Protocol, referred to as "MSP" to encode and process thalamic motion in a like manner to human neural synchronization, thereby minimizing processing times, and increasing security, and increasing reliability, and enhancing the capabilities of artificial intelligence, and expanding the capacity of existing computer networks and systems.

Figure 1:
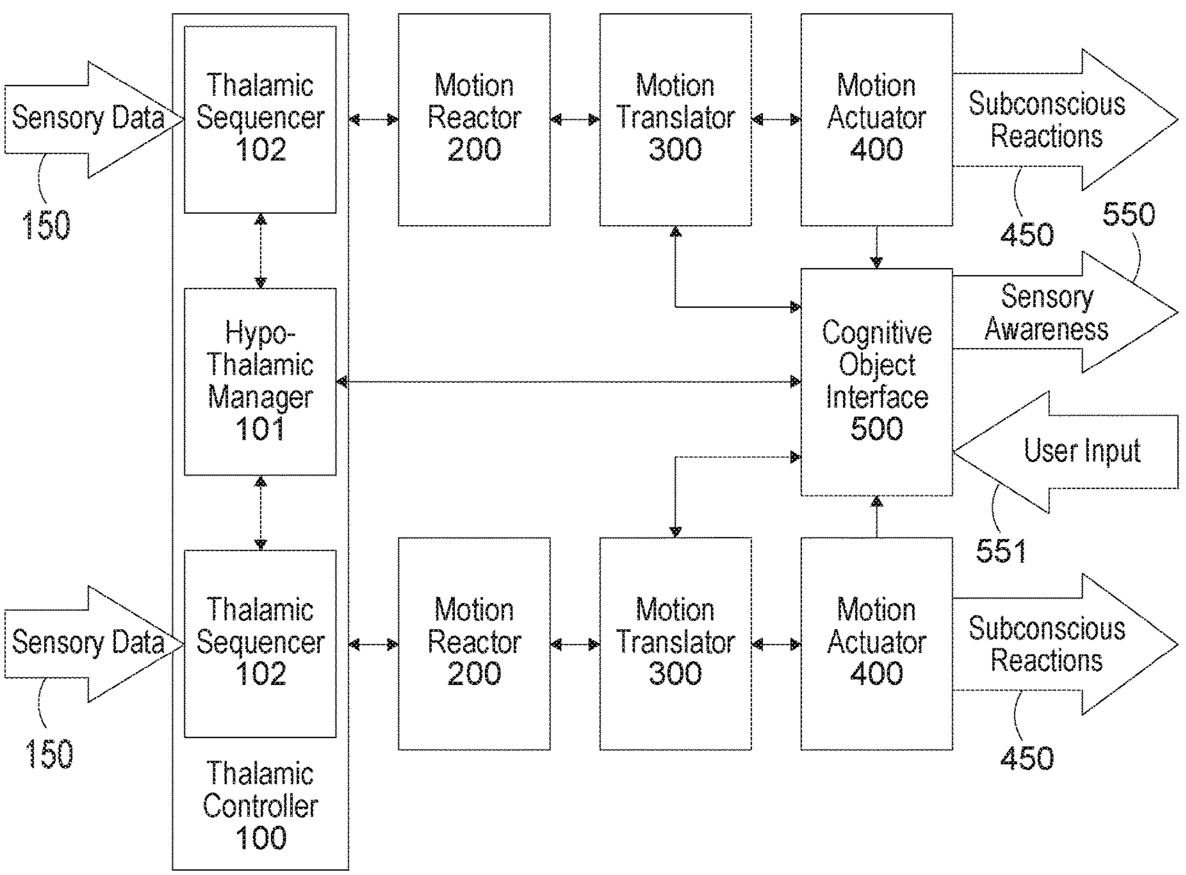
FIG. 1 illustrates an implementation of an artificial brain according to the present disclosure.

With a neural synchronous framework in place, the process of the artificial brain can be implemented in computer software using standard components and modules as depicted in FIG. 1. The major difference in design between a human brain and an artificial brain is directly associated with the fact that a human brain has all of its components on a single machine while an artificial brain can be distributed across a variety of machines using a computer network. The resultant system implementation takes this distribution capability into account allowing the various components of an artificial brain to be spread out amongst any number of computer devices.

Referring to FIG. 1, five computer software components are required to assemble and run an artificial brain and they include a Thalamic Controller 100, a Motion Reactor 200, a Motion Translator 300, a Motion Actuator 400, and Cognitive Object Interface 500. All five components can run on a single computer or can be deployed on multiple computers. With reference to FIG. 1, the Thalamic Controller 100 is responsible for managing and sequencing the process execution of the artificial brain. An artificial brain can be composed of a single lobe or multiple lobes. Depicted in FIG. 1 is a multi-lobe implementation. The Thalamic Controller 100 coordinates the timing of any number of artificial brain lobes by deploying a separate Thalamic Sequencer 102, a Motion Reactor 200, a Motion Translator 300, and a Motion Actuator 400 for each lobe. The Thalamic Controller will translate all inbound sensory data into thalamic motion and then neural synchronously activate the different brain services in sequence to produce and consume Natural Intelligence. The Motion Reactor 200 provides a software framework for plugging in and executing the different brain services required to complete a single artificial brain processing cycle.

Thalamic motion is feed into a Motion Translator 300 which will convert the general intelligence data to symbolic intelligence, search memory, and select appropriate motor actions to perform. The translated thalamic motion will then be feed into a Motion Actuator 400 that will perform motor actions and correlate final thought production. The Motion Actuator 400 produces subconscious reactions and feeds final thought production into the Cognitive Object Interface 500. The Cognitive Object Interface 500 provides a user interface which produces sensory awareness to facilitate advanced learning and incorporate human decision-making. In essence, a user's cognitive abilities are being harvested to drive and train the artificial brain.

Figure 2:
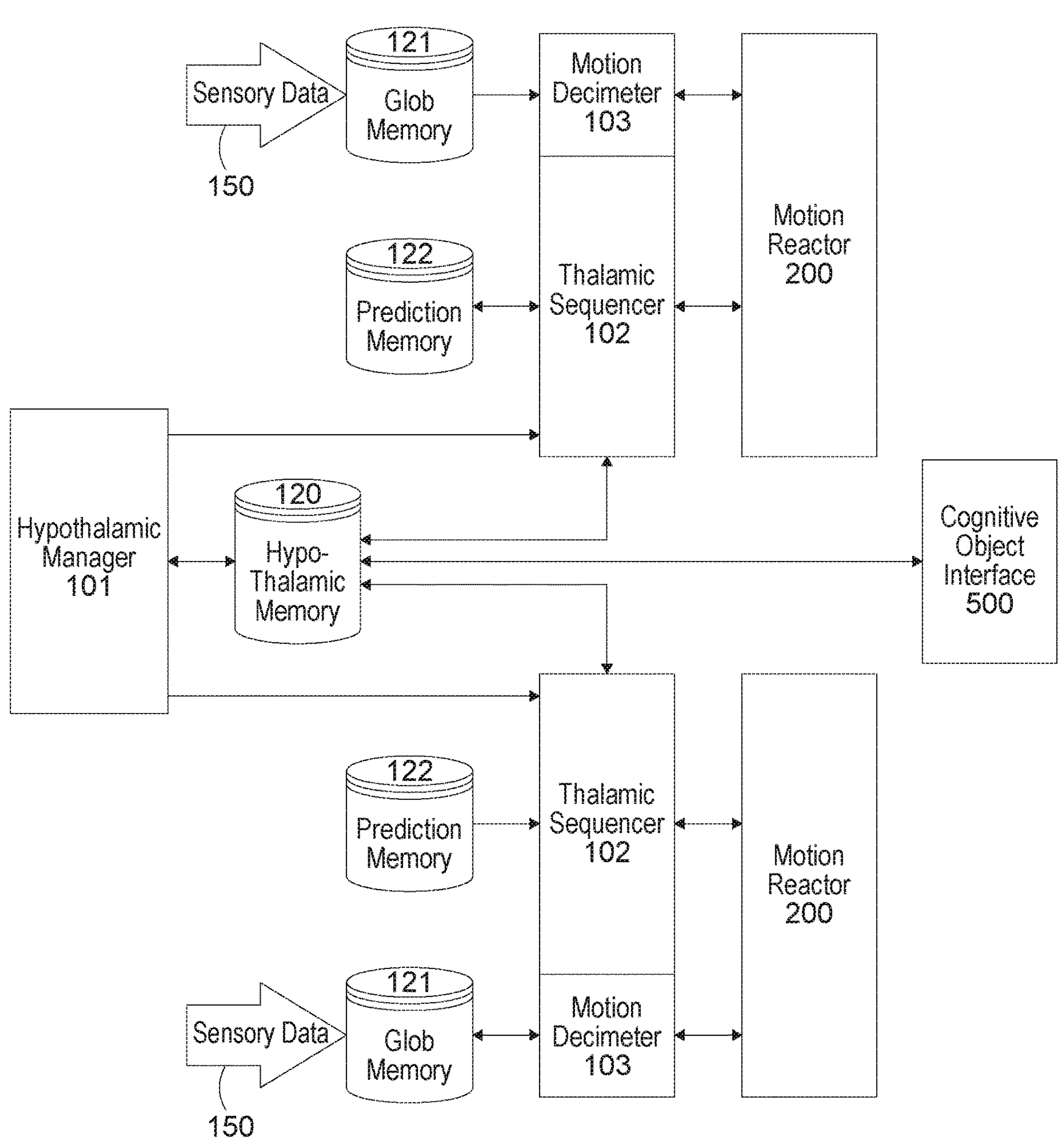
FIG. 2 illustrates an implementation of a thalamic controller according to the present disclosure.

In reference to FIG. 2, the Thalamic Controller 100 is run through a single Hypothalamic Manager 101 process. The Hypothalamic Manager 101 runs on an execution cycle where it will launch, coordinate, and synchronize any number of Thalamic Sequencer 102 process threads. While the human brain is limited to two lobes (left and right), the artificial brain can manage any number of independent lobe processes each controlled by its own Thalamic Sequencer 102. The Hypothalamic Manager 101 establishes the central neural synchronous timing cycle for the artificial brain and will launch any number of Thalamic Sequencer 102 process threads. Each Thalamic Sequencer 102 process thread will execute an artificial brain lobe process cycle and signal the Thalamic Manager 101 upon completion. Once all process threads have signaled, the Hypothalamic Manager 101 will coordinate final thought production output, will produce emotional effects, will compensate for sensory overlap, and will increment sensory motion prediction for the next Hypothalamic 101 process cycle.

In reference to FIG. 2, each Thalamic Sequencer 102 is responsible for managing and processing sensory input data through the artificial brain process to produce sensory perception, thought production, and subconscious reactions. The Thalamic Sequencer 102 will sequence the firing order of the different brain services needed to perform the function of a single lobe of the artificial brain. The Thalamic Sequencer 102 establishes its own separate neural synchronous state in its own time relativity to connect and execute all the brain services needed to complete one artificial brain lobe process cycle. This creates a unique effect where the neural synchronous state of the Thalamic Sequencer 102 becomes embedded into the neural synchronous state of the Hypothalamic Manager 101. This embedding capability creates a neural synchronous process firing sequence that can execute all the distributed brain service components in a single process cycle while the sensory data is held in a single state. The Hypothalamic Manager 101 functions as the neural synchronous root where each Thalamic Sequencer 102 and each brain service that it uses becomes embedded into the sequence of the root's process cycle.

Each embedded neural synchronous process will confirm its execution and completion in the level where it was triggered. Each level will then confirm itself to the level above it where it was triggered, so on and so on. The neural synchronous process finally culminates into the final confirmations sent to the Hypothalamic Manager 101 that each Thalamic Sequencer 102 has fired all of its brain service components in the correct sequence and has completed execution. Once signaled, the Hypothalamic Manager 101 will perform its final tasks and complete its neural synchronous process cycle. The embedding of neural synchronous processes will be further detailed in following section on the Motion Reactor 200.

In reference to FIG. 2, all object or record-based forms of computer sensory data are input as Sensory Data 150 and can be deposited by any number of outside asynchronous processes into Glob Memory 121 storage structure unit including but not limited to virtual memory, disk drives, neural networks, or relational databases. The Thalamic Sequencer begins its process cycle by executing the Motion Decimator 103. The Motion Decimator 103 will process all Glob Memory 121 into thalamic motion and will transmit that data to a Motion Reactor 200 for brain service processing.

In reference to FIG. 2, the Thalamic Sequencer 102 has two methods for sequencing the execution of brain services, internal and external. Internal is used if a particular artificial brain component is implemented on the same computer as the Thalamic Controller 100 where process and memory resources will be shared. With an internal setting, the Thalamic Sequencer 102 will control the firing of every individual brain service component needed to complete an artificial brain lobe process cycle. So, after the Motion Decimator 103 completes, the Thalamic Sequencer 102 will begin a synchronous execution of each brain service for all internally connected artificial brain components.

External is used when an artificial brain component is executing on a separate computer where the synchronous operation and memory must be distributed across a computer network. With an external setting, the Thalamic Sequencer 102 distributes the synchronous execution to a network connected artificial brain component. That component will then be responsible for synchronously executing a sequenced chain of brain services and may further synchronize with any number of other brain components distributed on different computers. In external, the Motion Decimator 103 will be responsible for triggering and consolidating all remote brain services. After all brain services for a given artificial brain lobe are executed in their correct sequence, the Motion Decimator 103 will signal the Thalamic Sequencer 102 upon completion. The Thalamic Sequencer 102 will then synchronize Prediction Memory 122 to prepare it for the next process cycle and signal the Hypothalamic Manager 101 when done.

The external setting is going to be the most common configuration so in FIGS. 2, 4, 5 and 7, the explanations and depictions assume each artificial brain component will be distributed onto separate computers. Also, the different types of memory have been identified in all the diagrams to represent their potential for distribution across a computer network or for their consolidation if locally installed.

Figure 3:
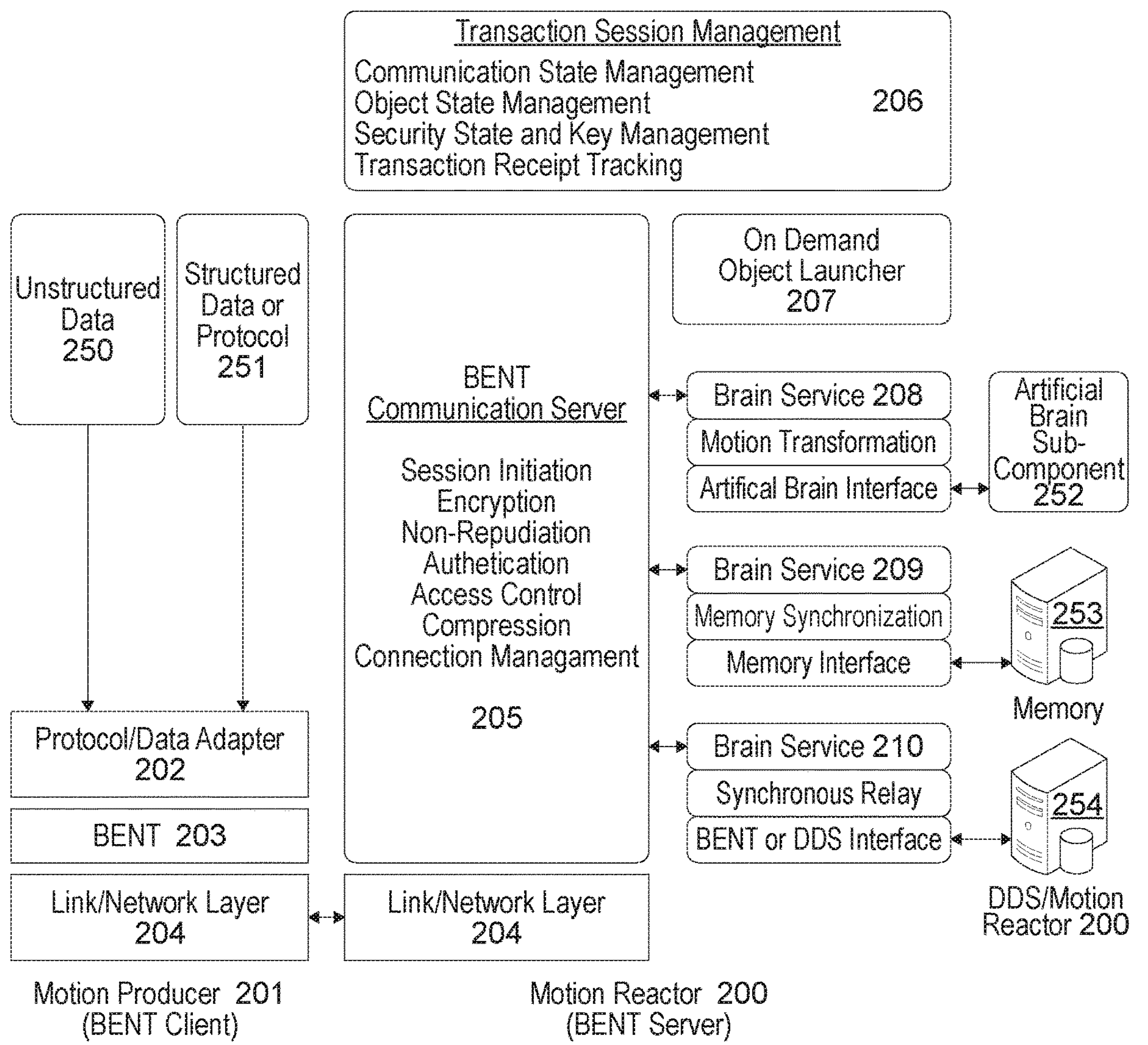
FIG. 3 illustrates an implementation of a motion reactor according to the present disclosure.

In reference to FIG. 3, the Motion Reactor 200 will perform synchronous computer operations across a computer network. The Motion Reactor 200 is a network server whose purpose is to provide secure data communication services between a Motion Producer 201 and a set of Brain Services 208, 209, 210. The Motion Producer 201 constructs a network messaging packet that forms a transactional request to the Motion Reactor 200 to synchronously execute a requested brain service computer operation. The Motion Reactor 200 provides the general software programming framework for organizing, deploying, and sequencing different artificial brain components and sub-components needed to duplicate the formation of Natural Intelligence. The neural synchronous process the Motion Producer 201 initiates with the Motion Reactor 200 will facilitate the process execution of either an individual or a series of Artificial Brain Sub Components 252 that in their sequenced totality create the natural intelligence framework for the artificial brain.

In reference to FIG. 3, a Motion Producer 201 will process Unstructured Data 250 and Structured Data 251 into a Protocol/Data Adapter 202. Protocol/Data Adapter 202 will parse and normalize the inbound motion-based data streams into a single format based on the data-typing for individual (globs) or grouped data elements (globular clusters). For example, a computer data record would be considered a globular cluster that is composed of globs of data fields. Data Typing is the universal language of computer data processing and a necessity for network data transmission.

The resultant normalized globs and globular clusters are translated into a Binary Encoded Neural Transmission (BENT) protocol. BENT 203 is a network data messaging protocol that contains a message header, a security header, and a message payload of organized data types. BENT 203 data messaging runs in a client-server relationship based on a Request/Reply model that allows it to either push or pull data from one or more Motion Reactors 200 (BENT-Servers). BENT 203 converts the motion data into a network transaction request that will result in the synchronous execution of one or more Brain Services 208, 209, 210. BENT 203 can be transmitted across a Link/Network Layer 204 using either a link layer protocol such as MIL-STD-1553 or a network layer protocol such as Internet Protocol (IP).

In reference to FIG. 3, a Motion Producer 201 connects and authenticates to a Motion Reactor 200 which will allow the Motion Producer 201 to request any number of brain services that may be available on the Motion Reactor 200. The Motion Reactor 200 is a multiple process software system that incorporates a Communication Server 205 to provide secure application services to any number of Motion Producers 201. The Communication Server 205 manages security and will initiate a separate process thread to handle the BENT-Client brain service request and will be responsible for channeling any resultant reply back to the BENT-Client. The Communication Server 205 does not queue objects to be launched; instead, it launches them on-demand. This ensures real-time execution and allows data transactions to be run synchronously across a computer network.

The Motion Reactor 200 is a high-speed secure network bridging platform for performing real-time process-to-process communication. It is a middleware platform that effectively solves many of the ongoing security problems currently being experienced by industry. It allows highly centralized security systems to interoperate with alternate security protocols functioning across a non-secure distributed network such as the Internet. The Motion Reactor 200 is fully compatible with all existing network security systems and is designed to protect the dataflow level independent of local device/router security. This effectively separates and distributes individual security responsibilities by establishing a chain-of-custody where each stage of the computer process can protect itself according to its own requirements and duties. Basically, increasing the speed, depth, and capacity of existing security through decentralization.

Standard security in the Motion Reactor 200 can perform the following four functions:

Encryption

When a client application establishes a network connection to the Motion Reactor 200, an RSA 2048-bit public/private key pair exchange is used to negotiate a session key that will be used to encrypt traffic between the server and client. The session key can be for a 168-bit Triple-DES key (FIPS 140-1 mode) or a 256-bit AES key (FIPS 140-2 mode) or through the plug-in interface that can be used for other higher-grade ciphers. Once a session is established, all packets exchanged between the client and server bear an HMAC-SHA1 hash of the packet, the auto generated session key, and a transaction serial number. The Motion Reactor 200 is designed to automatically protect itself independent of existing security systems.

Authentication

Different applications can have vastly divergent authentication requirements. The Motion Reactor recognizes these diverse requirements and has provided an open, flexible authentication plug-in architecture. The plug-in maps vendor-specific authentication activities to a generalized model for incorporation and use in the Motion Reactor 200. The result is an ability to combine support from different authentication systems on-the-fly and sequence the credentials against any application or transactional event.

Access Control

The Motion Reactor's 200 conditional access technology provides access control tightly integrated with the authentication plug-in model enabling a centralized access control policy spanning credentials from multiple authentication systems. Access control functionality can be applied to all credentials which are exposed via any authentication plug-in to manage, enforce, and audit individual brain service transactions.

Auditing

The Motion Reactor 200 simultaneously audits and monitors the network layer, the session layer, the application layer, and data access layer. So, security management will be able to determine (1) that a user/device is generating a certain type of network traffic or data pattern; (2) that a user/device is requesting/executing specific transaction types; and (3) that a user/device is accessing a specific database, table, record, or data field By employing a multilayered tracking system, the Motion Reactor platform provides the necessary granularity needed to monitor and gather any level of auditing details for any type of data sharing or collaboration activity.

In addition to the standard security functions described above, the Motion Reactor 200 can also provide an enhanced layer of security that actually adds fictitious content to the data stream before encryption including the following two types:

Ghost Data

Ghost Data is false data systematically constructed to look like real data and is inserted at different points in the data stream. The amount of fictitious data is regulated by a configuration parameter in the BENT-Client. The Motion Reactor 200 negotiates with a BENT-Client to establish a sequencing combination that can be used to remove the fictitious content. So, even if the encryption is penetrated, without knowing the combination, an intruder cannot reliably identify the contents of the transmission because they will not be able to distinguish what data is real and what data is fabricated.

Picture-In-Picture

Where Ghost Data takes a more random approach by polluting the data stream with false elements, Picture-in-Picture creates a false data picture and hides the elements of the real data stream inside of that false picture. For example, a perimeter sensor security grid may be signaling multiple breaches where Picture-in-Picture will construct a false data stream indicating that all is clear. The breach warnings will actually be hidden in sub elements of that all clear data stream. The Motion Reactor 200 will extract the real data out of the sub elements to reconstruct the original data stream.

The Motion Reactor 200 also incorporates a Transaction Session Manager (TSM) 206. The Transaction Session Manager 206 manages the multiple transmission and data states associated with a BENT-client network request. Transaction Session Manager 206 maintains transactional integrity and provides seamless recovery for BENT-Clients that lose or alternate Link/Network Layer 203 connections. By separating the multiple process states where failure of one process does not necessitate the failure of the other, the Transaction Session Manager 206 dramatically reduces errors and eliminates the potential for data loss raising network transaction success rates up to 99.999999%.

The On-Demand Object Launcher 207 when requested by the BENT Communication Server 205 will instantiate a plug-in software object and start its execution into the assigned process thread. Software objects are organized into Brain Services 208, 209, 210 and used to group and secure access to the different levels of functionality that can be exposed via a BENT-Client. Software objects can incorporate any block of software programming code using any number or type of third-party software development kits, application programming interfaces, computer protocols, software libraries, or custom code implementations. Basically, any block of software code can be encapsulated into a software object and using the brain service framework plugged into the Motion Reactor 200.

Brain Service 208 is the general designation for the various operations that activate specific Artificial Brain Subcomponents 252. These subcomponents when fired in the correct sequence will implement the artificial brain's process of Natural Intelligence. Brain Service 209 is a general designation for sharing memory between computers. Since many of the components of the artificial brain's process rely of the staged formation of memory by different brain components, this brain service allows that memory to be shared across the network. Brain Service 210 demonstrates the ability of the Motion Reactor 200 to encapsulate itself where the software object is also a BENT-Client. As such, it is able to connect to any number of downstream Motion Reactors 200 to relay a brain service request. The key characteristic of the Brain Service 210 is that all operations are performed in neural synchronous real-time. Essentially, the system creates a firing sequence that can synchronously execute all of its software objects wherever they are located using a single BENT-Client to initiate and control the process.

Brain Service 210 also provides an interface to connect through a Data Distribution Service (DDS). DDS is a prevailing industry specification for normalizing, optimizing, and integrating computer data transmissions such as those used in Internet of Things sensory data. The DDS specification describes a Data-Centric Publish-Subscribe (DCPS) model for distributed application communication and integration. By providing a DDS interface, Brain Service 210 can relay operations for the artificial brain through a data distribution network. Operations can be synchronously controlled directly through the DDS or by using a downstream Motion Reactor to provide acknowledgements. Also, since the relayed sensory data carries its own state, any downstream brain service simply executes the motion commands contained in data transmission to synchronize the remote state to the original observation time regardless of what intermediate asynchronous or synchronous process it must travel through.

The Motion Reactor 200 is the central software framework that forms the communication backbone for connecting and integrating artificial brain components. All operations initiated through the Motion Reactor 200 are neural synchronous in nature and will be securely executed in real-time. Basically, it is the glue that holds the artificial brain together.

Figure 4:
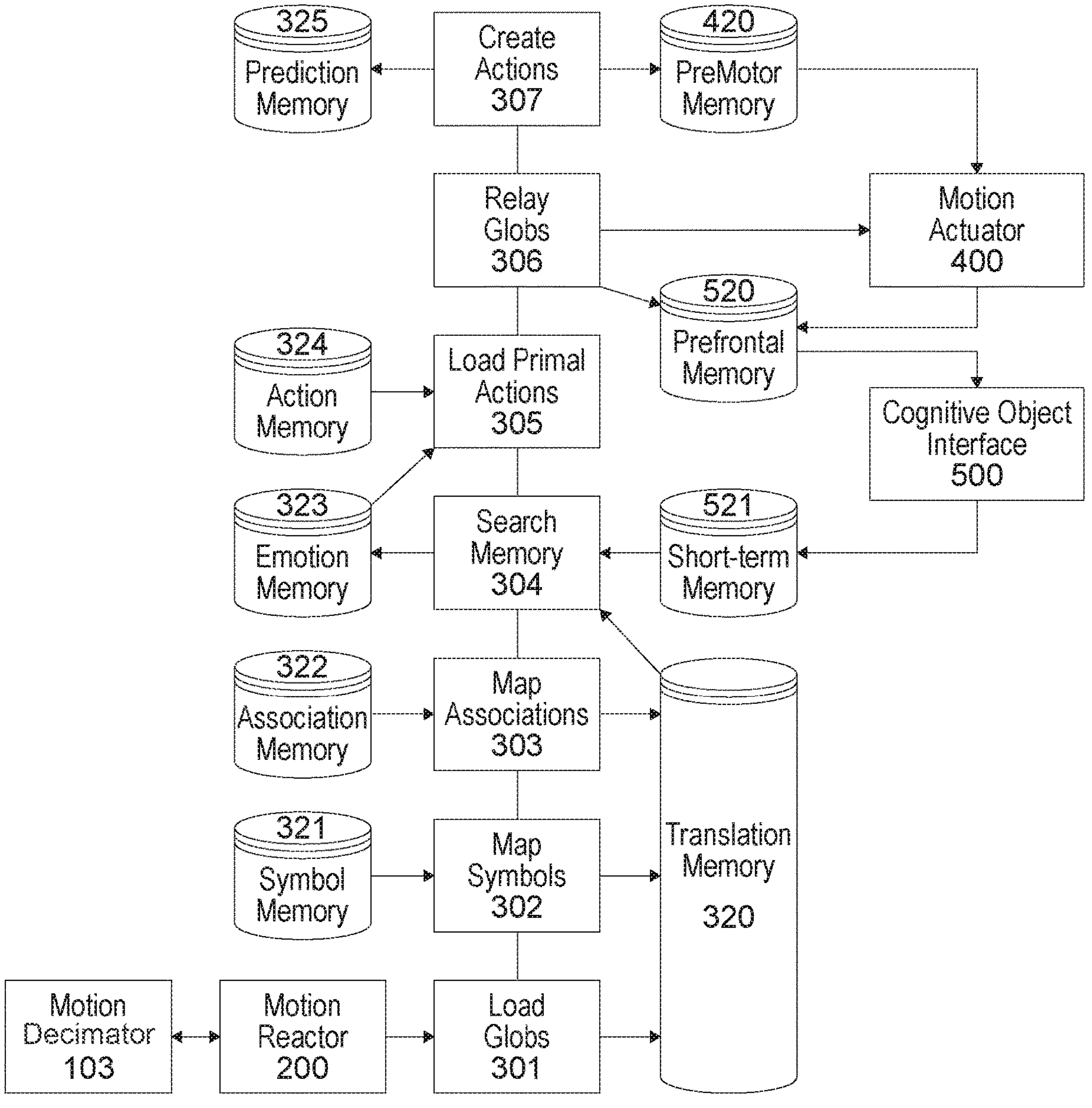
FIG. 4 illustrates an implementation of a motion translator according to the present disclosure.

Turning now to FIG. 4, the Motion Translator 300 has been designed to duplicate the functionality of the human occipital lobe. The Motion Translator 300 will translate general intelligence to symbolic intelligence to motor action for all unpredictable thalamic motion originating from the computer data records and data frames. General Intelligence is a flat data structure composed of predictable and unpredictable globs and globular clusters. While this structure is fine for the production of the Sensory Perception data stream, the Thought Production data stream produced by the Motion Translator 300 requires that the contents of the globs and globular clusters be interpreted and processed. The Motion Translator 300 maps visual symbols and associations to the globs and globular clusters which then can be used for searching memory for a recommended set of motor actions to form a reaction to the unpredictable motion present in the sensory data stream.

FIG. 4 depicts a distributed Motion Translator 300 artificial brain component running on a separate computer from the Thalamic Controller 100 depicted in FIG. 2. In a network distributed configuration, the Motion Translator 300 will contain its own Motion Reactor 200 for executing artificial brain services and synchronizing memory. In reference to FIG. 4, the Motion Decimator 103 initiates and controls the execution of the Motion Translator 300 process. The Motion Decimator 103 will neural synchronously trigger the first brain service with a payload of unpredictable thalamic motion data of globs and globular clusters. When the first brain service completes execution, it will automatically trigger each subsequent brain service in sequence to complete the function of the Motion Translator 300 artificial brain component. In the distributed configuration, the Motion Decimator 103 requires only a single neural synchronous brain service request to control the execution of the entire Motion Translator 300. Once the Motion Translator 300 has completed, it will signal the Motion Decimator 103 with a synchronous reply that will contain prediction updates for its future sensory motion measurements.

In reference to FIG. 4, the Motion Translator 300 when signaled by the Motion Decimator 103 will execute the following brain services in sequence:

Load Globs 301

The first brain service executed by the Motion Translator 300 is Load Globs 301 which will synchronize the first level of Translation Memory 320 with thalamic motion data arriving from the Motion Decimator 103. Translation Memory 320 is organized into multiple levels representing a memory pyramid that is capable of categorizing sensory data in a hierarchical tree structure. The glob layer is the lowest level of the pyramid where unpredictable globs and globular clusters are synchronized by applying the motion commands present in the Motion Control Protocol-based data packets. Translation Memory 320 will contain an entry for all sensory data being tracked and measured.

Map Symbols 302

Neural Synchronization is a sensory measurement and communication process that does not require any understanding of the contents of sensory information. For the artificial brain to begin deciphering these contents requires the use of symbolic intelligence to represent the contents of globs and globular clusters. Symbolic Intelligence is hierarchically organized visual symbol representation of the sensory data that provides the basis for memory organization and cognitive reasoning in the artificial brain. Very similar to Egyptian Hieroglyphics, each symbol has cognitive meaning and when combined form a visual representation of a sensory experience. These experiences are applied to an activity context and will eventually generate motor actions and Thought Production.

Once all the unpredictable globs and globular clusters are loaded from the neural synchronous measurement cycle, Map Symbols 302 will assign each with a visual symbol. For example, one globular cluster of hospital patient sensory data may now be represented by a single image of that patient. Map Symbols 302 will map each glob or globular cluster to a visual symbol retrieved from Symbol Memory 321 and will store the information in the second pyramidal level of Translation Memory 320. The Motion Translator 300 does not create the symbols, it only maps existing symbols previously known and made available in Symbol Memory 321 by preloading or by a cognitive process such as the Cognitive Object Interface 500. Translation Memory 320 will accumulate one of more indexes to the visual images from Symbol Memory 321 to complete the Map Symbols 302 brain service operation.

Map Associations 303

After the initial symbol mapping is complete, Map Associations 303 will next assign categories to the symbols. Category assignments are also symbolic and based on an activity context. The activity context is mandatory in order to differentiate and associate the correct set of symbols to assign to a particular sensory experience. This differentiates identical or similar sensory experiences in order to produce different actions. For example, a human arm moves differently when swinging a hammer as opposed to swinging a baby. The activity context sets the parameters and boundaries for individual or group action selection.

Within the activity context, Map Associations 303 will assign associations to each of symbols present in Translation Memory 320. The Motion Translator 300 does not create the associations, it only assigns existing associations previously known and made available in Association Memory 322 by preloading from by a cognitive process such as the Cognitive Object Interface (COI) 500 through cognitive focus. Cognitive focus is different than visual focus. Visual focus is a process of saliency directed by the superior colliculus. This is different than cognitive focus which is being directed from the frontal lobe. For example, watching a baseball game while thinking about the concert attended the night before. While the eyes may continue to focus and react to the baseball game, cognitive focus is on the concert.

General intelligence is a flat bottom-up encoding of globs and globular clusters, where symbolic intelligence is a hierarchical indexing of symbols to produce a top-down encoding which is required for cognitive processing. Map Associations 303 completes the symbolic intelligence translation phase of the Motion Translator 300. Once the translation is completed, Translation Memory 320 contains the original data globs/globular clusters with its symbolic translation.

Search Memory 304

The Search Memory 304 brain service will use resultant Translation Memory 320 to perform a search of Short-term Memory 521. The Motion Translator 300 is designed to process unpredictable sensory motion into a set of automated actions. As part of this process, Search Memory 304 will attempt a fast search of Short-term Memory 521 based on the unpredictable elements of the sensory experience matched against symbolic intelligence. The nature of the memory search is limited because the process must have a guaranteed response time in order to maintain neural synchronous real-time. Unpredictable search times that access Long-term Memory 523 must be performed by a computer process outside of the neural synchronous state such as the Cognitive Object Interface 500 (COI).

Short-term Memory 521 is the central interchange point between the subconscious Motion Translator 300 process and conscious Cognitive Object Interface 500 process of the artificial brain. Search results will carry activity-related motor actions that need to be performed for a given sensory experience and various emotional states that will be stored in Emotion Memory 323. Short-term Memory 521 also contains updates for Symbol Memory 321 and Association Memory 322 which also originates from the Cognitive Object Interface 500.

Load Primal Actions 305

Load Primal Actions 305 is a stage of action production that can assign default actions drawn from the Action Memory 324 if no search results are returned from Search Memory 304. Since the Motion Translator 300 may not have a suitable translation, Load Primal Actions 305 may still generate motor actions based on the system's emotional state and desire to survive. These emotionally reactions of survival are the equivalent to human instinctual responses to threats perceived in the environment. The closest analogy is when a human feels pain and may perform a physical reaction to the event before consciously understanding what is creating that pain.

Relay Globs 306

The original unpredictable glob and globular cluster thalamic motion data that was processed in Load Globs 301 is synchronously relayed to the Motion Actuator 400. This motion data allows the Motion Actuator 400 to analyze and prepare higher thought production. It carries the knowledge of what predicted sensory readings were successful and will eventually be used to automate actions associated with those readings.

Create Actions 307

Create Actions generates new or modified actions associated with a given activity. This represents the final stage of unpredictable motion processing in the Motion Translator 300 where actions will be finalized to adapt to changes in the sensory environment. This brain service duplicates the functions of the upper occipital lobe from the motor cortex (M5) through the exit onto the dorsal stream in V6A. All new or modified actions created to respond to unpredictable motion are sent to Pre-Motor memory 325. Once Create Actions 307 completes, it will signal the Motion Actuator 400 to begin its execution.

Figure 5:
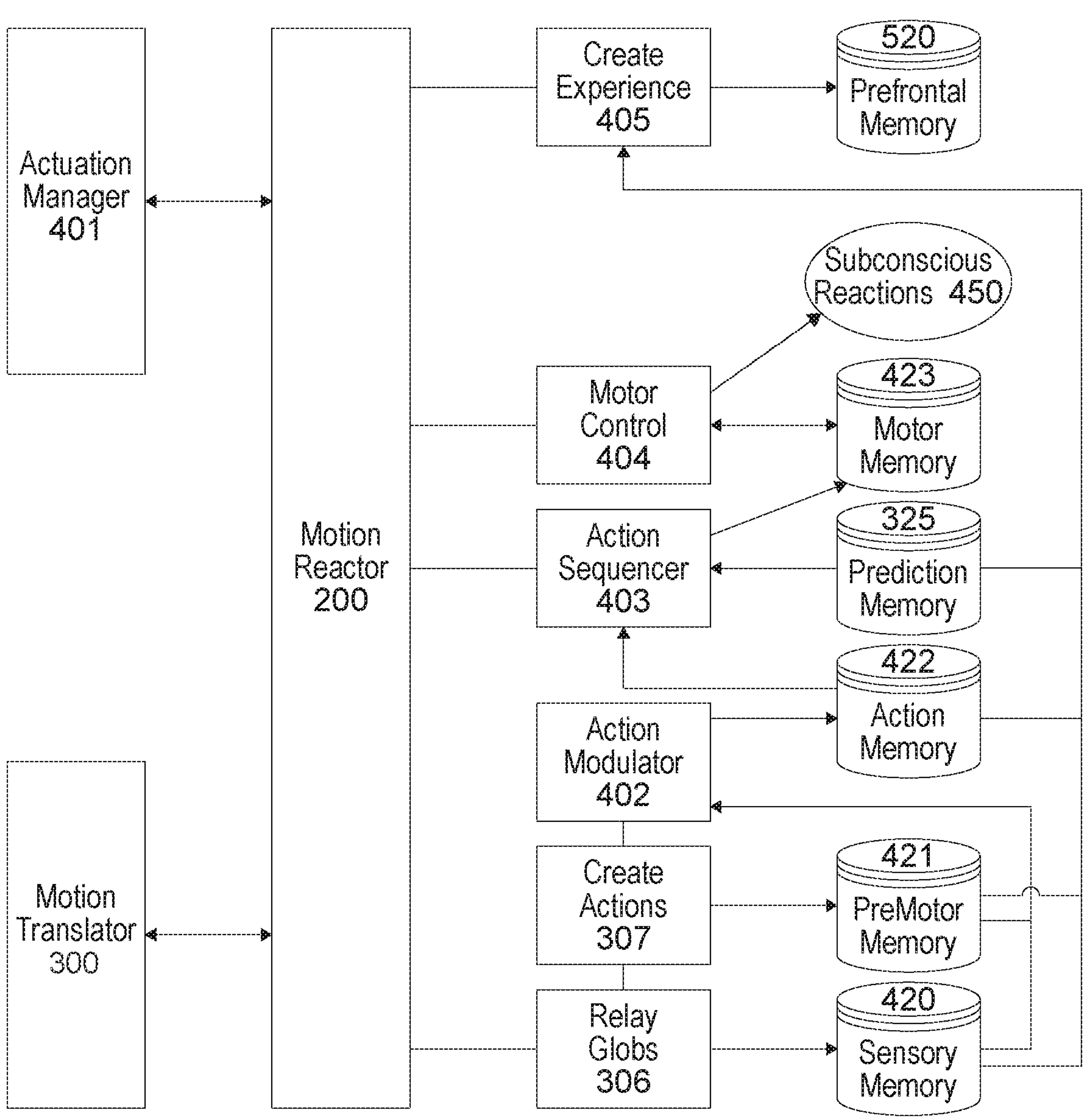
FIG. 5 illustrates an implementation of a motion actuator according to the present disclosure.

Turning now to FIG. 5, the Motion Actuator 400 duplicates the function of the basil ganglia and much of the process of the parietal lobe including parts of the cerebral cortex, somatosensory cortex, premotor cortex, and all motor controls. The basic function of the artificial brain is to turn sensory motion into physical reaction. The physical reaction is composed of a series of motor actions that trigger a corresponding set of motor controls. The Motion Actuator 400 sequences it execution by physical motor index mapping all related sensory data to that indexing system. So, in general sequence, flat sensory data globs are mapped to a cognitive symbolic data hierarchy in the Motion Translator 300. That symbolic data tree is then subsequently mapped to a physical motor data hierarchy in the Motion Actuator 400 to eventually produce a flat sequence of motor actions. The Motion Actuator 400 then combines the globs, the cognitive symbolic tree, the motor data tree, and emotional states to create time-dilation memory destined for future cognitive processing as the final stage of the Thought Production process.

The Motion Actuator 400 is functionally a bridge between the artificial brain's neural synchronous process and its own. The neural synchronous process is designed to allow the different asynchronous processes of the artificial brain to interact with each other relative to their own process time-frame. This bridging capability is mandatory because the Motion Actuator 400 execution time takes far longer to complete than other neural synchronous activities. In the artificial brain, the Motion Actuator 400 cycles much slower than Thalamic Controller 100 in order to execute motor controls and correlate Thought Production. The Motion Actuator 400 process cycle is set to duplicate the timing of the cognitive process such as the Cognitive Object Interface 500. The Motion Actuator 400 incorporates a neural synchronous modulation process that allows it to translate, regulate, and bridge the dataflow between the Motion Translator 300 and the other Motion Actuator 400 components.

FIG. 5 depicts a distributed Motion Actuator running on a separate machine than the Motion Translator 300. In FIG. 5, the Motion Translator 300 is running from an upstream BENT-Server which is functioning as a BENT-Client for the Motion Actuator 400. A Motion Reactor 200 is required to integrate all distributed components of the artificial brain's process which includes the Motion Actuator 400 and all of its subsystems. The Motion Reactor 200 allows neural synchronization to exist across network and computer boundaries which is fundamental to the process of Natural Intelligence production and consumption. The artificial brain's process must be able to establish a single synchronous data state regardless of how many of its components are distributed.

The process of the Motion Actuator 400 begins when the Motion Translator 300 executes its final components, Create Actions and Relay Unpredictable Globs. The Motion Translator 300 synchronously executes these components and then triggers the Action Modulator 402. The Action Modulator 402 runs as part of the same neural synchronous process as the Motion Translator 300 so the Motion Translator 300 will wait for the complete process execution of the Action Modulator 402.

Actuation Manager 401

In reference to FIG. 5, the Motion Actuator starts with the Actuation Manager 401 component. The Actuation Manager 401 is a stand-alone application that runs asynchronous to the artificial brain's neural synchronous state. The Actuation Manager 401 is a BENT client and will connect with the local Motion Reactor 200 to access artificial brain component services. The Actuation Manager sets its own cycle time where it will periodically check for input from a Motion Translator 300. The Actuation Manager 401 then regulates the dataflow into both Motor Control 404 and Store Experience 405.

Action Modulator 402

The Action Modulator 402 controls the starting, stopping, and intensity level of all the different motor actions that can be performed by the Motor Control 404. It controls the level of action potential that will be feed into Motor Control 404 for individual or group motor actions. Application examples would include providing the ability for a robot hand to grasp an object and regulate the pressure to hold that object or providing the ability for oil pipeline to open or close values to regulate its flow.

The Motion Translator 300 will signal the Action Modulator 402 to neural synchronously process two inbound data streams. This first data stream contains the raw unpredictable sensory globs organized by its synchronous state and is stored in Sensory Memory 424. This is the original data stream produced by the Motion Decimator 103 in FIG. 2. Similar to the Motion Translator 300, the Action Modulator 402 in FIG. 5 can read the synchronous motion commands from Sensory Memory 420 to recreate the original state of the sensory data present in the Motion Decimator 103 in reference to FIG. 2. The second data stream contains the current thought processing associated with the unpredictable motion present in the first data stream and will be stored in Premotor Memory 422 in reference to FIG. 5. Thought processing at this stage of the artificial brain is composed of the cognitive symbolic intelligence, the emotional states, and the requested new motor actions.

The Action Modulator 402 will produce a list of motor actions using the system motor data hierarchy used in Motor Memory 421. Each motor action will contain an intensity setting that will be used to modulate and adjust Motor Control 405 execution. The intensity setting is derived from the emotion state of the artificial brain and the projected prediction success rate. With this information, the Action Modulator 402 can assume either an inhibited or uninhibited state which will be applied to the intensity setting. Inhibited discourages motor action and uninhibited encourages motor action. Once all motor actions for a given neural synchronous measurement cycle have been stored in Action Memory 425, the Action Modulator 402 will signal its cycle completion to the Motion Translator 300 which will signal its completion to the Motion Decimator 103 in reference to FIG. 2 which signals its completion to the Thalamic Sequencer 102 which in turn signals its completion to the Hypothalamic Manager 101.

Action Sequencer 403

The Actuation Manager 401 in reference to FIG. 5 will sequentially process each motor action stored in Action Memory 425 by triggering the Action Sequencer 403. The Action Sequencer 403 searches Prediction Memory 426 to correctly sequence and prepare motor actions for storage in Motor Memory 421. Prediction Memory 426 contains motor action sequences and their associated sensory patterns. For example, a robotic finger may create 20 sequenced motor actions to make the finger bend. Each one of these actions will contain a predicted sensory state which will eventually be used to confirm the success of any executed motor action. The Action Sequencer 403 after processing unpredictable motion and executive override motor actions from Action Memory 425 will automatically advance the sequence for all remaining motor actions in Motor Memory 427 since their outcomes have already been predicted.

One of the defining characteristics of all life forms is its ability to physically react before sensory motion occurs. This capability is provided to the artificial brain by the Action Sequencer 403 which uses sensory prediction to activate current actions based on future measurement cycles. By skipping ahead in the sensory sequence, the Action Sequencer 403 compensates for the time differentiation of the different artificial brain components. For example, a Thalamic Sequencer maybe cycling sensory measurement at 500 milliseconds while the Motion Actuator is cycling motor actions at 2000 milliseconds. In this timing relationship, the Action Sequencer 403 will at a minimum produce motor actions based on the sensory pattern predictions five (5) sensory measurements cycles ahead. By moving time forward farther in the sequence, the Action Sequencer 403 accelerates motor actions to exceed sensory measurement speed achieving faster than real-time operation.

The Action Sequencer 403 will process all new motor actions stored in Action Memory 425 and will store its results in Motor Memory 426 which is a pyramidal structure capable of storing a hierarchical tree. The hierarchical tree model patterns the motor control system in a method similar to a human body where the body is the root of the tree and all connected components are organized and referenced by their physical location. For example, the body has an arm that is connected to a hand that is connected to a finger and so on. In the same manner for computer sensory data, a hospital may be considered the body that connects to a floor which connects to a room that connects to a hospital bed that connects to a lift motor.

Motor Control 404

The Actuation Manager 401 in reference to FIG. 5 will signal Motor Control 404 which will traverse the tree to correctly sequence all the motor actions. Motor actions can be composed of any form of computer process that executes a sequence of software that can trigger digital or analogue signals. This includes but is not limited to network messages, emails, notifications, digital actuations, database operations, data management systems, standards-based interfaces, and legacy software. In the artificial brain, motor actions are basically computer transactions or functions that need to be performed in specific sequences.

Motor action success will not be judged by the Motion Actuator 400. Its ultimate success will be determined by propagating the sensory prediction data back to Prediction Memory 125 in the Thalamic Sequencer 101 in reference to FIG. 2 for measurement during the next neural synchronous cycle of the Motion Decimator 103. Decoupling of execution and measurement is the key to creating subconscious reactions in an artificial brain. By separating motor execution from measurement, the artificial brain can perform automated reactions without the need to access higher reasoning functions such as those provided by a Cognitive Object Interface 500 for validation. An action will generate a predicted sensory pattern that can be measured much more efficiently in the next cycle of the Motion Decimator 103 where a simply XOR measurement using the prediction measured against the current sensory reading will indicate success or failure of any given motor action operation. A subconscious reaction is basically a set of motor actions that do not require conscious confirmation to complete. This separation of motor action from success confirmation is what creates Subconscious Reactions 450 in reference to FIG. 5 in the artificial brain.

Create Experience 405

The Actuation Manager 401 final task in its execution cycle will be to activate the Create Experience 405 brain service. Create Experience 405 finalizes Thought Production and prepares it for advanced analysis and decision-making by a conscious process such as the Cognitive Object Interface 500. Thought production at this level of the artificial brain requires that all unpredictable glob data be combined with symbolic data, motor action data, and emotion data so that it can be stored into Prefrontal Memory 520. This combined data load represents Thought Production for a given cognitive measurement cycle in the artificial brain.

Figure 6:
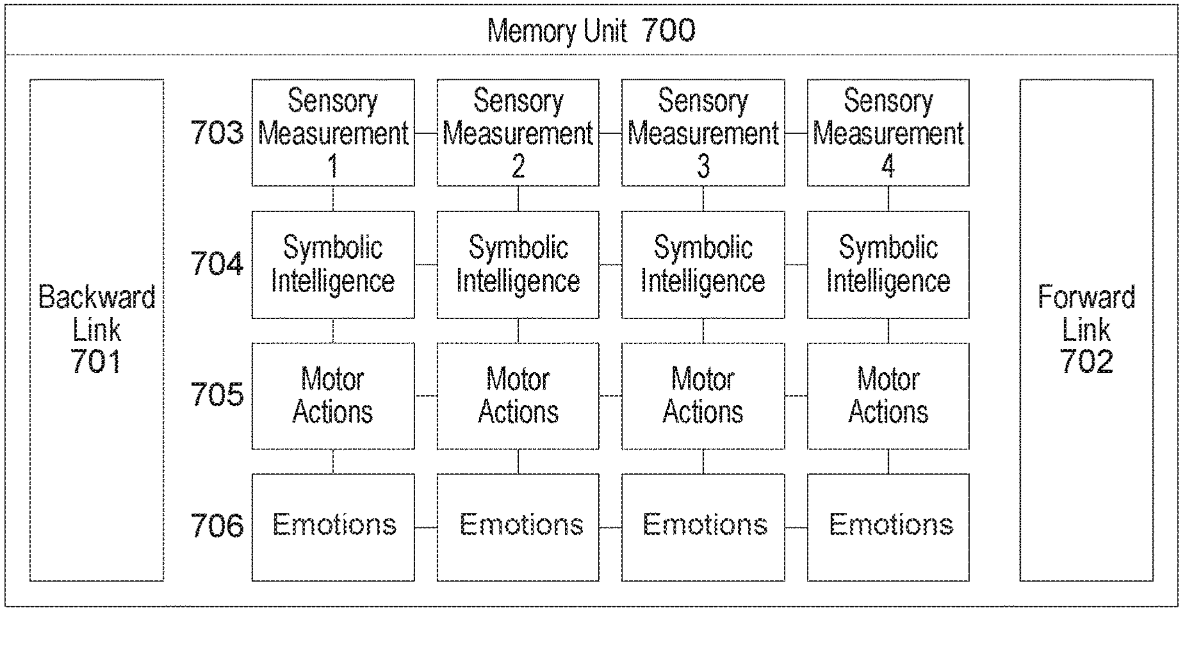
FIG. 6 illustrates time-dilation memory according to an embodiment of the present disclosure.
Figure 8:
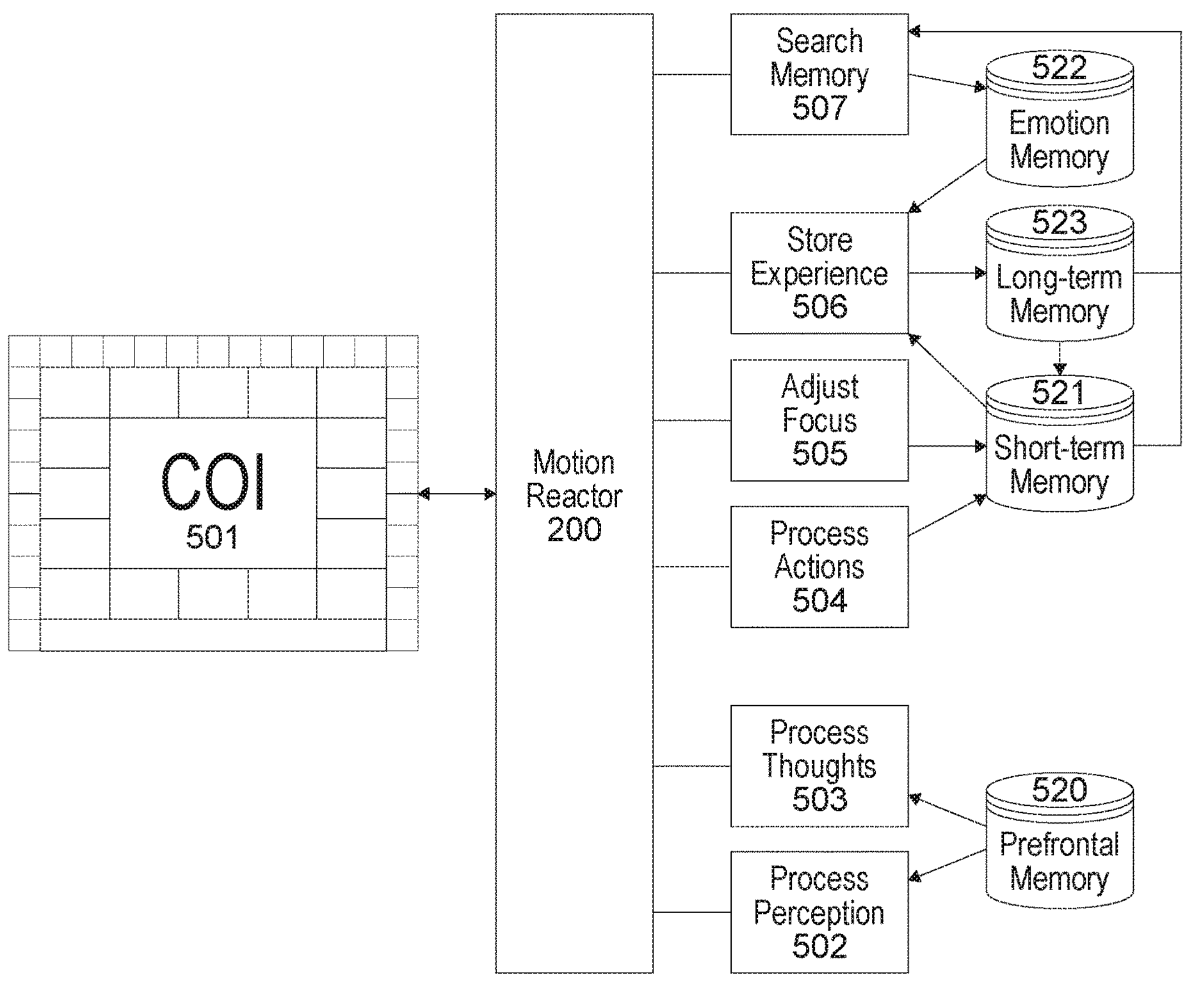
FIG. 8 illustrates the relationship between a cognitive object interface according to FIG. 7 with other features of the invention.

FIG. 6 depicts the time-dilation memory structure used by both Short-term Memory 521, Long-term Memory 523, and Prefrontal Memory 520 in reference to FIG. 8. In reference to FIG. 6, Memory Unit 700 represents the basic memory unit built and consumed by the artificial brain. Memory Unit 700 is composed of a series of neural synchronous sensory measurement cycles. The length of the series is proportional to the difference in measurement time between sensory measurement and cognitive measurement. For example, in the human brain, eyesight sensory measurement executes on a cycle around 33 milliseconds and the cognitive state executes measurement around 300 milliseconds. Roughly speaking, it represents a 9-to-1 ratio. So, for this configuration, Memory Unit 700 would contain 9 individual measurement cycles of the artificial brain's process.

Each measurement cycle contained in Memory Unit 700 is an accumulation of all results produced by the different components of the artificial brain. In reference to FIG. 1 and FIG. 6, Sensory Measurement 703 is the product of the Thalamic Controller 100. Symbolic Intelligence 704 is the product of the Motion Translator 300. Motor Actions 705 are the product of the Motion Actuator 400. Emotions 706 are the product of searching memory in both the COI 500 and the Motion Translation 300. The result of this combination of data elements creates a matrix organization inside Memory Unit 700 as depicted in FIG. 6. The data matrix ensures continuity between the different cycles of measurement and establishes a pattern for recording and cross-indexing the experience.

In addition to the experience data, Memory Unit 700 contains a Backward Link 701 and a Forward Link 702. Backward Link 701 connects the current Memory Unit 700 to the previous Memory Unit 700. In like fashion, Forward Link 702 connects to the next Memory Unit 700. The linked architecture allows the artificial brain to produce a Memory Chain 707 that in its totality represents a recorded experience for a given activity such as what would be necessary in order for a robot to learn to walk or a control system to learn to operate an automated factory. Using this structure, the artificial brain can follow the Backward Link 701 to determine cause and follow the Forward Link 702 to determine effect of any given sensory experience.

The cause-effect nature of Memory Chain 707 provides the basis for organizing complex sensory experiences for storage, searching, prediction, and automation. Assuming a 9-to-1 ratio as present in a human brain, each Memory Unit 700 of the artificial brain would contain 9 generations of sequential sensory measurements. When the sensory measurements are concatenated, they form a specific sensory data pattern. It is important to note that time-dilation memory encoding differs significantly from current techniques used in the artificial intelligence. Artificial intelligence is highly reliant on mathematical analysis of time-series data patterns to produce intelligence and in this example would process the 9 sensory measurements into a statistical average. The problem is by averaging the measurements, it destroys the unique sensory data pattern that identifies the experience.

In both the human brain and the artificial brain, there is no access to mathematics. Mathematics itself is actually an enhanced form of symbolic intelligence and is only understood and available in a conscious process such as the COI 500 in reference to FIG. 1. The base mechanics of the artificial brain uses pattern matching to perform all of its subconscious memory functions. By matching to the Memory Unit 700 and using a Memory Chain 707 in reference to FIG. 6, the subconscious process of the artificial brain navigates from causal data patterns to the effects data patterns. It has no understanding of the contents of the experience, the artificial brain is simply processing and matching time-dilation memory patterns.

The Memory Chain 707 enables the artificial brain to follow the Forward Link 702 to derive any needed predictions to automate activities and increase efficiency in its neural synchronous process. The minimum time length of the prediction is based on the ratio between sensory measurement and cognitive measurement. So, in the example 9-to-1 ratio, the artificial brain using the next Memory Unit

700 in the Memory Chain 707 will predict 10 sensory measurement cycles ahead to normalize the timing and sequencing between the conscious and subconscious processes.

Figure 7:
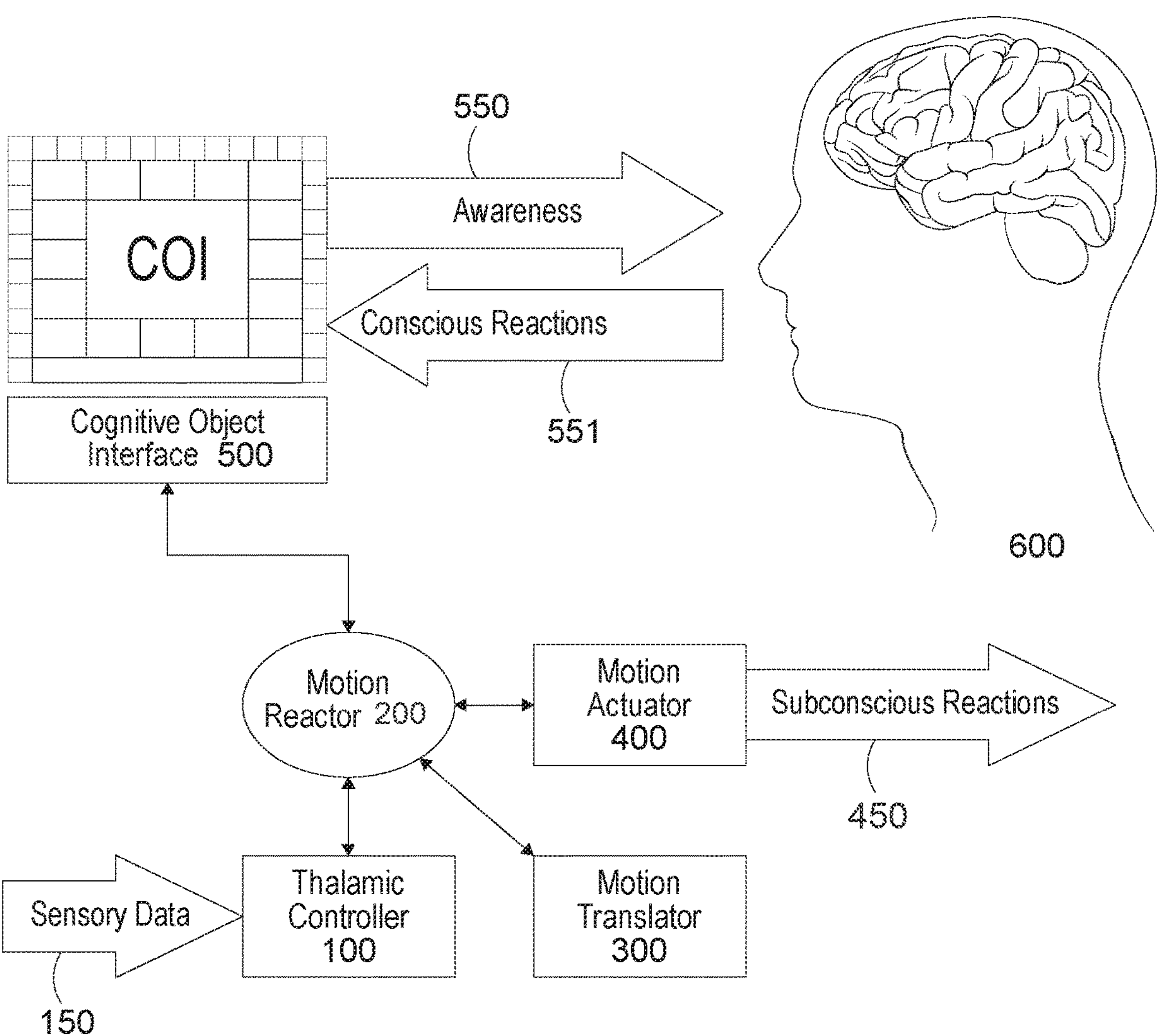
FIG. 7 illustrates a cognitive object interface according to an embodiment of the present disclosure.

To team human cognition with an artificial brain requires the use of a Cognitive Object Interface 500 in reference to FIG. 7. The artificial brain processes Sensory Data 150 using general intelligence and provides a symbolic translation for that data to the Cognitive Object Interface 500 to produce Awareness 550. Human eyesight then provides the translation between the Cognitive Object Interface 500 and the neural constructs of the Human Brain 600 forming a Symbolic Alignment in the frontal lobe and lower occipital lobe (V2 & V3) of the user. With this alignment, the Human Brain 600 teaches the artificial brain to automate it activities as a simple function of survival, the primary function of life. Symbols are feed in, a hierarchy is imposed, an activity is selected, and an associated set of reactions is provided.

The Cognitive Object Interface 500 forms a survival game using real or simulated sensory data to create and maintain an artificial sensory-based reality. Using the artificial reality, the user navigates the symbol hierarchy by changing focus to create associations and plays the game by simply matching symbol patterns to reactions. The user's focus, associations, and reactions are harvested from the Conscious Reactions 551 as a learning experience. The Cognitive Object Interface 500 is responsible for coordinating all learning activities to consolidate their translation from symbolic intelligence to general intelligence so that it can be used by the artificial brain. As experience grows, the Cognitive Object Interface 500 is able to generate greater and greater degrees of situational awareness and automation to the point where the conscious human brain can understand millions of sensors in near real-time performing most of the activity automatically. This is the same natural intelligence process that a human mind goes through to learn to ride a bike or perform any activity.

The Cognitive Object Interface 500 incorporates a system of emotions which are necessary to translate between general and symbolic intelligence. Since the artificial brain does not understand content, there is no direct communication between the artificial brain (subconscious—general—bottom-up) and the mind (conscious—symbolic—top-down). The artificial brain must communicate with the mind-based interface through a series of emotions that generate both positive and negative reinforcement (pain and delight) on decision-making and focus. In essence, emotions simultaneously filter and set priority for both general and symbolic objects in 3-dimensional space relative to current environment. Emotions also dictate which sensory experiences are transferred from Short-term Memory 521 to Long-term Memory 523 in reference to FIG. 8.

In reference to FIG. 7, the artificial brain's basic function is to process Sensory Data 150 into both Subconscious Reactions 450 and Awareness 550. The Thalamic Controller 100 is responsible for managing the primary neural synchronous state of subconscious process and as such is responsible for initiating and managing the artificial brain's subconscious process firing sequence. The Thalamic Controller 100 converts Sensory Data 150 to thalamic motion and transmits that motion data to a Motion Reactor 200 to neural synchronously execute processes in both the Motion Translator 300 and the Motion Actuator 400. The Motion Translator 300 interprets the thalamic motion using symbolic intelligence creating motor actions that can be automated by the Motion Actuator 400 to produce Subconscious Reactions 450. Reactions that cannot be automated because of unpredictable thalamic motion are formed into thoughts by the Motion Translator 300 and the Motion Actuator 400 and sent to the Cognitive Object Interface 500 for decision-making.

One of the primary functions of the subconscious process of the artificial brain is to translate sensory data into awareness and determine whether awareness must either be escalated to the Cognitive Object Interface 500 or be applied to automating activity. The Cognitive Object Interface 500 processes two data streams produced by the artificial brain, Sensory Perception and Thought Production. Sensory Perception is composed of globs and globular clusters and is used to update symbols in the visual display of Cognitive Object Interface 500. Thought Production is composed of globs and globular clusters combined with symbolic intelligence, motor actions, and emotions and form experiences that can encourage the user to focus and make decisions regarding a specific activity.

The Cognitive Object Interface 500 in reference to FIG. 8 cycles its internal processes on a specific timing interval. The timing interval is relative to its interaction with the artificial brain and establishes a pattern for distilling experiences for time dilation memory encoding. The following processes are required to implement a Cognitive Object Interface 500:

COI 501

Figure 9:
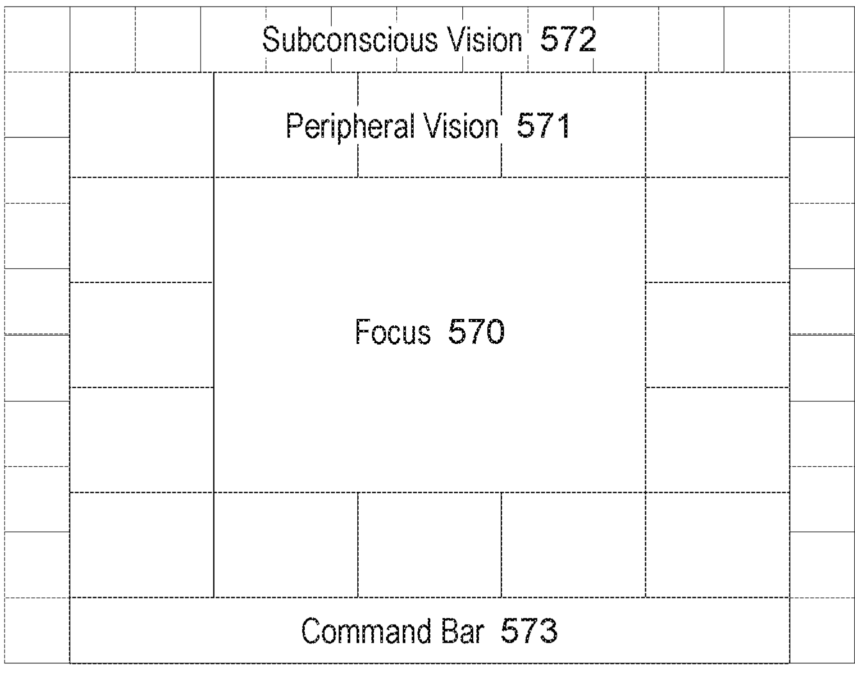
FIG. 9 illustrates an expanded view of a cognitive object interface according to an embodiment of the present disclosure.

In reference to FIG. 9, the COI 501 organizes sensor feeds into the form of cognitive objects and these objects are displayed on tiles with recognizable symbols on one of three levels. At the center of the COI 501 is Focus 570 which is a largest tile and represents the focus level of the cognitive interface. When an object is in focus, its inherent values and sub objects will be displayed. The second layer of the COI 501 is Peripheral Vision 571 which consist of a series of medium-sized tiles that represent the peripheral vision level of the cognitive interface. Objects in peripheral vision will have a limited set of inherent values displayed. The final outer layer of the COI 501 is Subconscious Vision 572 and consist of a series of small-sized tiles that represent the subconscious level where only a single symbol is displayed. At the bottom of the display is the Command Bar 573 which provides the user with the ability to interact with the object in Focus 570 for activity selection, scheduling, grouping, value assessment, subconscious suggestion, and motor action selection.

Subconscious Vision 572—Artificial subconscious intelligence is tracking the motion of every object derived from all the different sensory data streams. When objects show certain unpredictable motion patterns, the subconscious display is used to notify the user when cognitive objects need attention or decision-making.

Peripheral Vision 571—Peripheral vision provides a display of cognitive objects and the objects that they may contain in a symbolic form that allows the mind to organize the objects for rapid information assimilation. Peripheral vision works on the concept of delivering information before the user actually needs it and providing a visual bridge between objects in order to accelerate cognition, association, and decision-making.

Focus 570—Focus is the primary vision level and will display the most relevant information about an object or group of objects. When an object is in focus, the user can select sub objects for greater focus or create actions concerning the object using the Command Bar 573 at the bottom of the COI 501 display.

Load Perception 502

Load Perception 502 in reference to FIG. 8 is responsible for applying the updates for visual symbols currently displayed in the COI 501. Load Perception 502 will retrieve the Sensory Perception data as thalamic motion from Prefrontal Memory 520. Prefrontal Memory 520 contains a copy of the synchronous sensory state of the artificial brain that is maintained by the Thalamic Controller 100 and relayed from the Motion Translator 300 in reference to FIG. 5. From that copy, Load Perception 502 will update the graphical user interface based on which symbols are currently visually displayed in the Focus 570 and the Peripheral Vision 571 of the COI 501 in reference to FIG. 8.

Load Thoughts 503

Load Thoughts 503 in reference to FIG. 8 is responsible for sequentially processing thoughts in the format of time-dilation memory arriving from the Motion Actuator 400 in reference to FIG. 6. Since the COI 501 in reference to FIG. 8 cannot directly transfer thoughts into a human user's brain, the COI 501 must translate all artificial thoughts into a visual symbolic format intended to align with the symbols in a human user's occipital lobe achieving a state of Symbolic Alignment. The artificial brain syncs with the human brain by relaying symbols through the human visual process to manipulate the human thought production process at the symbolic level. By alternating the symbols and the manner in which they are displayed, the COI 501 produces a level of awareness for the user where their thought production becomes a simply derivative of the artificial brain's production of Natural Intelligence. As Load Thoughts 503 adjust the symbols in the COI 501, the visual effect of the symbolic alignment will create the same thought production pattern in the user's brain.

Load Thoughts 503 in FIG. 8 is responsible for updating Subconscious Vision 572 in reference to FIG. 9 of the COI 501. Subconscious notifications are produced for this level of the display and consist of the symbols and associations out of cognitive focus that are either exhibiting unpredictable motion or are related to current user actions. Load Thoughts 503 from FIG. 8 will insert the symbols into Subconscious Vision 572 in FIG. 9 and update their display based on artificial emotions. Each artificial thought processed by Load Thoughts 503 in FIG. 8 carries with it an emotional setting relative to the artificial brain's overall emotional state which is stored in Emotion Memory 522.

Although there are many levels of emotions that can be employed to create effects, they all ultimately boil down in the artificial brain to FEAR and JOY which can also be seen as punishment and reward. FEAR is caused by unpredictable sensory motion. To restore the sensory motion to predictable creates JOY. To facilitate this structure, Emotion Memory 522 stores FEAR and JOY levels for every symbol and association. Emotion Memory 522 also stores overall FEAR and JOY levels that reflects the artificial brain's general emotional state. Using these two basic emotions, Load Thoughts 503 will change the background colors for symbols in Subconscious Vision 572 in reference to FIG. 9. For example, higher FEAR levels may set the background for the symbol from a pale yellow to a very bright red where a higher JOY level can mitigate this effect producing various shades of green. High FEAR or JOY levels can also escalate a cognitive object to Peripheral Vision 571 or in extreme cases to Focus 570.

Load Thoughts 503 in reference to FIG. 8 also controls what is displayed in Peripheral Vision 571 of the COI 501 in reference to FIG. 9. Peripheral Vision 571 is populated with relevant associations to the cognitive object in Focus 570. These associations are identified by the Motion Actuator 400 in reference to FIG. 5 and are put into the thought production stream. The purpose of Peripheral Vision 571 in reference to FIG. 9 is to supply the user with all relevant information that may be necessary for the user to make decisions (select or not select actions) for the cognitive object in Focus 570. Load Thoughts 503 in FIG. 8 will also use emotions to create display effects to attract user focus and highlight relationships. These effects range from background color changes to enhancing or aligning visual symbols.

Process Actions 504

Process Actions 504 in FIG. 8 responds to action requests originating from Command Bar 573 in FIG. 9. The following general action request are supported:

Activity Selection—The COI 501 interprets symbols, sets hierarches, establishes associations and generates available motor actions based on an activity context. The activity context defines the parameters and boundary conditions of decision-making in the artificial brain. The user can select from the available activities list giving them access to different capabilities and tasks. When an Activity Selection is changed, the COI 501 will activate Search Memory 507 to retrieve the necessary context data from Long Term Memory 523 to reload its display and reset its options.

Scheduling—The artificial brain is capable of performing both direct and indirect actions. Direct actions usually involve digital actuation of a specific function such as a robot lifting its arm or a coolant control system regulating temperature on a nuclear reactor. Indirect actions involve resources needed that are outside of control of the artificial brain usually involving human-based resources. Not all systems are fully automated and organizations must use human labor to fill gaps in the automation loop. The artificial brain cannot control these resources directly, so instead, it schedules an action to be performed by the human resource. Just like a direct action, there is no confirmation of action execution, the success of the action will be judged using future thalamic motion measurements.

Grouping—The COI 501 displays symbols organized into a hierarchy based on associations and an activity context. Grouping allows a user to alter the hierarchy and set new associations. This is part of the top-down learning subsystem and is used to generate higher levels of naturally forming intelligence. As experience performing an activity accumulates, it becomes possible to abstract new levels of knowledge that can alter or reorganize the hierarchical tree where symbols are indexed.

Value Assessment—The COI 501 is a tool for assisting the human mind in making complex decisions based on computer sensory data. Basically, the artificial brain turns sensory objects into cognitive objects that are then organized and rated based on their associations, emotions, priorities, and predictability. Most of this process occurs out of sight. The Value Assessment action allows the user to display a list of these internal values for the cognitive object in Focus 570 in reference to FIG. 9. The Value Assessment action also allows the user to set and adjust the emotional and priority rating scales of the cognitive object in Focus 570.

Subconscious Suggestion—The artificial brain can make recommendations for Motor Actions and display their projected results. Subconscious Suggestion provides the user with the ability to look forward in time to evaluate different outcomes before a Motor Action decision is made. This is also part of the top-down learning subsystem where different potential outcomes are analyzed and recorded for storage in Short-term Memory 521 and potentially in Long-term Memory 523.

Motor Actions—The user can select from a set of motor actions available to the cognitive object in Focus 570 in reference to FIG. 9. Which actions are available are specific to the object, its hierarchical classification, its associations, and its current condition. Motor Actions are queued in Short-term Memory 521 in reference to FIG. 8. These actions will then be available during the next neural synchronous cycle of the Motion Translator 300 in FIG. 4 which will find them and send the Motor Actions to the Motion Actuator 400 in FIG. 5 for execution. Just like a human brain, the artificial brain performs all Motor Actions subconsciously. Basically, conscious reactions are translated to subconscious execution because the COI is not capable of validating the individual results.

Adjust Focus 505

Adjust Focus 505 in FIG. 8 responds to focus requests originating from the COI 501. When the user changes focus on the display that focus change will be reflected in the cognitive organization of the Motion Translator 300 in FIG. 4. Both the COI 501 and the Motion Translator 300 maintain the same cognitive focus. Cognitive focus is significantly different than saliency-based focus. Saliency-based focus is non-cognitive and generated by any movement in visual sensory perception. Saliency-based focus has no thought or consideration for the motion since it is a process that is calculated with no interpretation of the sensory contents. In the human brain, saliency-based focus originates in the Superior Collides where the details of sensory data are not available and it serves to mindlessly focus the eyes on motion-only objects.

On the other hand, cognitive focus originates from a conscious process such as the COI 500 in FIG. 8 where the contents of the sensory data have been translated to symbols and user rationalization has been applied. Cognitive focus has a direct effect on the filtering capability of the Motion Translator 300 in FIG. 4 by focusing Thought Production on specific objects in motion eliminating unpredictable motion objects not in focus. The best example to consider is a person driving a car. Unpredictable visual movement is occurring all around the person. The driver of the car uses cognitive focus to keep the eyes on the road and execute the driving activity that is being performed. Saliency-based focus cannot perform this activity because it has no understanding of the activity and will be mindlessly drawn to all the unpredictable motion that is occurring with no cognitive organization.

Store Experience 506

Store Experience 506 in reference to FIG. 8 when triggered by the COI 501 will move Short-term Memory 521 into Long-term Memory 523. The COI 501 will first put the artificial brain in sleep mode before Store Experience 507 is activated. Sleep mode is a low-powered operational state that suspends other COI 501 operations and significantly limits the amount of input allowed in the Thalamic Controller 100, the Motion Translator 300, and the Motion Actuator 400 in reference to FIG. 1. The process for transferring memory from Short-term Memory 521 to Long-term Memory 523 takes a significant amount of time to cross-index the experience to existing memory for storage. During this time period, ill-timed access to Short-term Memory 521 by other artificial brain components could damage the neural synchronous state maintained between the components producing unpredictable results.

Store Experience 506 in FIG. 8 will sequentially process all Memory Units 700 in reference to FIG. 6 accumulated in Short-term Memory 521 in FIG. 8 and will determine which of those memories will be stored in Long-term Memory 523. This determination is based on the emotional settings of each Memory Unit 700 in reference to FIG. 6. In the normal process of the artificial brain, a significant amount of duplicate and nonessential memory is produced. Store Experience 506 will filter this data out by only storing Memory Units 700 that exhibit high levels of FEAR and/or JOY. Lower levels of emotions indicate that Memory Unit 700 is not important or is already present in Long-term Memory 523 in FIG. 8. Once all data in Short-term Memory 521 is processed, Store Experience 506 will signal the COI 500 that Short-term Memory 521 has been processed and emptied. This will cause a reset of the artificial brain's neural synchronous state which is the final task of sleep mode. Once done, the artificial brain will wake up and return to normal operations.

Search Memory 507

When requested by the COI 501 using a symbolic-based index, Search Memory 507 in FIG. 8 will conduct a search of Long-term Memory 523. The COI 501 is the only component of the artificial brain that can directly access Long-term Memory 523 since searching this type of memory is non-deterministic with no guaranteed results or response time. This non-deterministic nature prevents Long-term Memory 523 from being accessed directly by the artificial brain's neural synchronous subconscious process. Instead, the artificial brain moves search results obtained from Long-term Memory 523 to Short-term Memory 522 where retrieval time is guaranteed. Short-term Memory 522 is working memory and serves as the data interchange point between the conscious and subconscious processes of the artificial brain.

Emotional variables are used to regulate the interaction between the conscious and subconscious processes of the artificial brain. When a conscious process such as the COI 500 or a subconscious process such as the Motion Translator 300 accesses Short-term Memory 522, they will produce emotions. Each Memory Unit 700 in reference to FIG. 6 contains Emotions 706 associated with an individual experience and as this memory is searched, the emotions are extracted and applied to the overall emotion states of the artificial brain stored in Emotion Memory 522 in FIG. 4 and FIG. 8.

Each emotion has its own level and whether that level goes up or down is predicated on the frequency of Short-term Memory 521 access. For example, if unpredictable motion is encountered in the sensory process and a search of Short-term Memory 521 provides no resolution then the failed search attempt will begin to raise the FEAR level. As each subsequent search attempt fails, the FEAR level will continue to rise until the issue is addressed and a resolution to restore prediction or remove the issue from cognitive focus is selected by a conscious process such as the COI 500. Basically, the subconscious process uses the FEAR emotion to force the conscious process through negative reinforcement to address and deal with the problem. In a like manner, restoring successful prediction uses positive reinforcement by raising the level of the JOY emotion which encourages the conscious process to make similar selections for future experiences.

To summarize key aspects of the invention described herein, the following table provides an implementation summary of an artificial brain as described herein:

| Process | Component | Brain Service[1] | Neural Synchronous Root | Brain Equivalent |
|---|---|---|---|---|
| Hypothalamic Manager 101 | Thalamic Controller 100 | No | Root | Hypothalamus |
| Thalamic Sequencer 102 | Thalamic Controller 100 | No | Hypothalamic Manager 101 | Thalamus |
| Motion Decimator 103 | Thalamic Controller 100 | No | Thalamic Sequencer 102 | Pulvinar, Lateral Geniculate Nucleus |
| Load Globs 301 | Motion Translator 300 | Yes | Motion Decimator 103 | Primary Visual Cortex V1 |
| Map Symbols 302 | Motion Translator 300 | Yes | Motion Decimator 103 | Occipital Lobe V2 |
| Map Associations 303 | Motion Translator 300 | Yes | Motion Decimator 103 | Occipital Lobe V3 |
| Search Memory 304 | Motion Translator 300 | Yes | Motion Decimator 103 | Occipital Lob V4, Temporal Lobe, Amygdala |
| Load Primal Actions 305 | Motion Translator 300 | Yes | Motion Decimator 103 | Motion Cortex M5 |
| Relay Globs 306 | Motion Translator 300 | Yes | Motion Decimator 103 | Primary Visual Cortex V1, Thalamus |
| Create Actions 307 | Motion Translator 300 | Yes | Motion Decimator 103 | Motion Cortex M5, Occipital Lobe V6, Occipital Lobe V6a |
| Action Modulator 402 | Motion Actuator 400 | Yes | Motion Decimator 103 | Striatum |
| Actuation Manager 401 | Motion Actuator 400 | No | Root | Cerebral Cortex |
| Action Sequencer 403 | Motion Actuator 400 | Yes | Actuation Manager 401 | Cerebellum, Thalamus |
| Motor Control 404 | Motion Actuator 400 | Yes | Actuation Manager 401 | Motor Control |
| Create Experience 405 | Motion Actuator 400 | Yes | Actuation Manager 401 | Somatosensory Cortex |
| COI 501 | Cognitive Object Interface 500 | No | Root | Frontal Lobe |
| Process Perception 502 | Cognitive Object Interface 500 | Yes | COI 501 | Prefrontal Cortex |
| Process Thoughts 503 | Cognitive Object Interface 500 | Yes | COI 501 | Prefrontal Cortex |
| Process Actions 504 | Cognitive Object Interface 500 | Yes | COI 501 | Hippocampus |
| Adjust Focus 505 | Cognitive Object Interface 500 | Yes | COI 501 | Hippocampus |
| Store Experience 506 | Cognitive Object Interface 500 | Yes | COI 501 | Hippocampus |
| Search Memory 507 | Cognitive Object Interface 500 | Yes | COI 501 | Temporal Lobe, Amygdala |

[1]A Motion Reactor 200 is required to execute all Brain Services.

The system, method, and computer program product of the present invention can be implemented on any wired or wireless communication medium including, but not limited to, satellite, cellular, wireless or hardwired WAN, LAN, and the like, public communication network, such as the Internet, and private communication network, such as an intranet. The design architecture of the system enables the system to easily integrate with any hardware platform, operating system, and most desktop and enterprise applications. The system is platform, network, and operating system agnostic.

The system, method, and computer program product of the present invention supports a wide range of data and network protocols, including but not limited to native support for IP, XML, IoT, WAP. The five application modules of the system, method, and computer program product of the present invention can be implemented using any operating system including, but not limited to Unix, Linux, VMS, IBM, Microsoft Windows NT, 95, 98, 2000, ME, XP, Vista, 7, 8, 10 and 11, and the like.

Employing natural intelligence processing, the system, method, and computer program product of the present invention can transport and process any type of data including ASCII Text, EBCIDIC, binary data, such as streaming video, streaming-real-time audio, image data (e.g., x-ray films), and unicode (i.e., for carrying different dialects of languages—e.g., Chinese, Japanese). The system, method, and computer program product of the present invention provides access to and delivery of content and applications to a full range of devices, regardless of whether the devices connect over wireline or wireless networks. It further provides the ability to seamlessly service multiple connection methods, wired and wireless connectivity service options, and device types (workstations/desktops, handhelds, cell phones, etc.) at the same time.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s).

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above-described exemplary embodiment.

Obviously, numerous modifications and variations of the present invention are possible in light of the above teachings. It is therefore to be understood that the invention may be practiced otherwise than as specifically described herein.

What is claimed is:

1. A system for producing and consuming natural intelligence using an artificial brain, the system comprising:

a thalamic controller software module, tangibly stored on a nontransitory computer readable medium comprising instructions which when executed by a processor cause the processor to establish the synchronous state of the artificial brain and begin cycling one or more motion decimator software modules;

one or more motion decimator software modules tangibly stored on a nontransitory computer readable medium comprising instructions which when executed by a processor cause the processor to:

establish a neural synchronous dependent process;

receive the inbound computer data consisting of data records and data frames;

perform spatial and temporal decorrelation of the inbound computer data;

translate components of the computer data into globs and globular cluster objects;

measure the objects by using an XOR operation against their predicted measurement to identify the objects as predictable motion or unpredictable motion; and;

encode unpredictable objects into thalamic motion encoding and synchronously send to one or more motion reactor software modules;

one or more motion reactor software modules tangibly stored on a non-transitory computer readable medium comprising instructions which when executed by a processor cause the processor to:

receive the thalamic motion instructions of the motion decimator software modules;

execute the thalamic motion instructions of the motion decimator software module to maintain an internal synchronous state in memory;

trigger a motion translator software module tangibly stored on a nontransitory computer readable medium comprising instructions which when executed by a processor cause the processor to:

map unpredictable thalamic motion from the glob memory to a symbolic memory;

map the symbolic memory to an association memory;

search a short-term memory for matches using the glob, symbolic, and association memories;

generate primal motor action requests in response to search failures;

create new motor actions requests in response to matches;

transmit new and primal motor action requests to a premotor memory connected to a motion actuator software module;

transmit synchronous glob memory, symbolic memory, and association memory to a sensory memory connected to a motion actuator software module; and trigger an action modulator software module in a motion actuator software module to process synchronous data from sensory memory to provide a bridge so the data can be understood in a slower time relativity;

a motion actuator software module tangibly stored on a nontransitory computer readable medium comprising instructions which when executed by a processor cause the processor to:

sequence new action requests using premotor memory;

sequence predictable action requests using time-dilation memory to provide faster-than-real-time operation;

execute motor action request in the motor control software module to produce subconscious reactions;

create time dilation memory by using the time dilation between sensory measurement cycle time and cognitive measurement cycle time where multiple sensory experiences are concatenated together to form a single cognitive experience; and send time-dilation memory to a cognitive object interface software module tangibly stored on a nontransitory computer readable medium comprising instructions which when executed by a processor cause the processor to:

display sensory perceptions comprising thalamic motion from prefrontal memory in its corresponding symbolic format to a user interface;

adjust display to generate awareness based on emotional variables and thought production comprising time-dilation memory from prefrontal memory;

align symbolic images with the neurology of the user's subconscious process;

adjust cognitive focus both by thought production and by user selection;

generate user awareness to encourage user action selection by altering symbols and cognitive focus;

process user action selection into short-term memory for indirect transfer into a motion translator software module;

search long-term memory for previous cognitive experiences stored in memory-chains of time-dilation memory; and sleep to transfer short-term memory to long-term memory and to reset the artificial brain;

send time-dilation memory to a motion decimator software module tangible stored on a non-transitory computer readable medium which when executed by a processor cause the processor to:

validate subconscious reactions based on predicted sensory measurement outcome;

provide top-down analytical predictions in a bottom-up measurement format;

perpetuate automation by advancing time-dilation memory to continually extract predicted future measurements; and reduce energy and resource usage by increasing prediction level.

2. The system of claim 1, wherein the plurality of inbound computer data consisting of data records and data frames is converted to thalamic motion based on original observation time and further encoded in a separate faster neural synchronous time cycle creating a time tunnel to process the thalamic motion into natural intelligence.

3. The system of claim 2, wherein an artificial subconscious process consisting of a thalamic controller software module and a motion translator software module and a motion actuator software module will interoperate using a motion reactor software module to communicate with an artificial conscious process using a cognitive object interface to produce and consume natural intelligence.

4. The system of claim 3, wherein the natural intelligence produced and consumed comprises thalamic motion for sensory perception and time-dilation memory for thought production.

5. The system of claim 3, wherein the artificial subconscious process only understands general intelligence and the artificial conscious process only understands symbolic intelligence forcing both processes to communicate using emotion-based variables.

6. The system of claim 1, wherein natural intelligence is produced and consumed using a deterministic subconscious process that maps general intelligence to symbolic intelligence to action requests to generate subconscious reactions and construct time-dilation memory which is used to generate awareness of sensor perception for a separate non-deterministic conscious process that provides an adaptation ability to adjust the deterministic subconscious process.

7. The system of claim 6, wherein the non-deterministic conscious process can be interfaced with artificial intelligence, human users, or other decision-making processes to provide the adaption needed to preserve the deterministic subconscious process and complete a cycle of natural intelligence production and consumption.

8. The system of claim 1, wherein a neural synchronous state can be established and maintained across a computer network or Data Distribution System (DDS) by establishing a neural synchronous root process that can embed other neural synchronous processes to form a single state and a single execution sequence.

9. A system for producing faster than real-time self-perpetuating automation, the system comprising:

a thalamic controller software module, tangibly stored on a nontransitory computer readable medium comprising instructions which when executed by a processor cause the processor to establish the synchronous state of the artificial brain and begin cycling one or more motion decimator software modules;

one or more motion decimator software modules tangibly stored on a nontransitory computer readable medium comprising instructions which when executed by a processor cause the processor to:

establish a neural synchronous dependent process;

receive the inbound computer data consisting of data records and data frames;

perform spatial and temporal decorrelation of the inbound computer data;

translate components of the computer data into globs and globular cluster objects;

measure the objects by using an XOR operation against their predicted measurement to identify the objects as predictable motion or unpredictable motion; and;

encode unpredictable objects into thalamic motion encoding and synchronously send to one or more motion reactor software modules;

one or more motion reactor software modules tangibly stored on a non-transitory computer readable medium comprising instructions which when executed by a processor cause the processor to:

receive the thalamic motion instructions of the motion decimator software module;

execute the thalamic motion instructions of the motion decimator software module to maintain an internal synchronous state in memory;

trigger a motion translator software module tangibly stored on a nontransitory computer readable medium comprising instructions which when executed by a processor cause the processor to:

map unpredictable thalamic motion from the glob memory to a symbolic memory;

map the symbolic memory to an association memory;

search a short-term memory for matches using the glob, symbolic, and association memories;

generate primal motor action requests in response to search failures;

create new motor actions requests in response to matches;

transmit new and primal motor action requests to a premotor memory connected to a motion actuator software module;

transmit synchronous glob memory, symbolic memory, and association memory to a sensory memory connected to a motion actuator software module; and trigger an action modulator software module in a motion actuator software module to process synchronous data from sensory memory to provide a bridge so the data can be understood in a slower time relativity;

a motion actuator software module tangibly stored on a nontransitory computer readable medium comprising instructions which when executed by a processor cause the processor to:

sequence new action requests using premotor memory;

sequence predictable action requests using time-dilation memory to provide faster-than-real-time operation;

execute motor action request in the motor control software module to produce subconscious reactions;

create time dilation memory by using the time dilation between sensory measurement and cognitive measurement where multiple sensory experiences are concatenated together to form a single cognitive experience; and send time-dilation memory to a motion decimator software module tangible stored on a non-transitory computer readable medium which when executed by a processor cause the processor to:

validate subconscious reactions based on predicted sensory measurement outcome;

provide top-down analytical predictions in a bottom-up measurement format;

perpetuate automation by advancing time-dilation memory to continually extract future predicted measurements;

further reduce energy and resource usage by increasing prediction level.

10. The system of claim 9, wherein artificial subconscious reactions are produced by executing actions without performing results validation in the motion actuator software module and deferring that validation to a subsequent cycle of thalamic motion measurement performed by a motion decimator software module.

11. The system of claim 9, wherein advancing a memory chain of time-dilation memory enables faster than real-time capability by producing current actions based on future sensory measurements.

12. The system of claim 9, wherein the thalamic motion measurement identifies predictable motion to perpetuate automated subconscious actions without interruption or further thought production.

13. A method for producing and consuming time-dilation memory, the method comprising:

transmitting computer data to a motion decimator software module tangible stored on a non-transitory computer readable medium which when executed by a processor cause the processor to:

receive a plurality of computer data comprised of data records and data frames;

convert computer data to thalamic motion which is general intelligence composed of globs and globular clusters;

send unpredictable thalamic motion to a Motion Reactor software module tangible stored on a non-transitory computer readable medium which when executed by a processor cause the processor to;

trigger a Motion Translator software module tangible stored on a non-transitory computer readable medium which when executed by a processor cause the processor to:

map general intelligence to symbolic intelligence by assigning visual symbols to the globs and globular clusters;

map associations to the visual symbols;

create new action requests based on searching short-term memory for unpredictable thalamic motion patterns;

send new action requests to premotor memory;

trigger a Motion Actuator software module tangible stored on a non-transitory computer readable medium which when executed by a processor cause the processor to:

modulate new action requests;

modulate predictable motion action requests;

execute actions in motor control to produce subconscious reactions;

consolidate memory using general intelligence consisting of globs and globular clusters with the visual symbols of symbolic intelligence with the actions performed by the motor control module with the emotions generated by searching short-term memory where in its totality represents thought production for a single moment in sensory measurement time;

buffer consolidated memory and concatenate with subsequent single moments in sensory measurement time relative to the time-dilation with cognitive measurement time where cognitive measurement time is slower than sensory measurement time;

use time-dilation effect to construct time-dilation memory so multiple moments in sensory measurement time are concatenated into a single cognitive experience and encoded with a backward link and forward link so as to be attached to other cognitive experiences in a memory chain;

send time-dilation memory to a cognitive object interface software module tangible stored on a non-transitory computer readable medium to generate awareness for symbolic interpretation and possible process adaption;

send time-dilation memory to a motion decimator software module tangible stored on a non-transitory computer readable medium which when executed by a processor cause the processor to:

validate subconscious reactions based on predicted sensory measurement outcome;

provide top-down analytical predictions in a bottom-up measurement format;

perpetuate automation by advancing time-dilation memory to continually extract predicted measurements;

further reduce energy and resource usage by increasing prediction level.

14. The method of claim 13, wherein time dilation memory is produced by a motion actuator software module tangible stored on a non-transitory computer readable medium which has the capability to interface into and bridge both sensory and cognitive time relativities.

15. The method of claim 13, wherein time-dilation memory is consumed by an artificial conscious process to produce cognitive awareness and an artificial subconscious process to increase energy efficiency and automate actions.

16. The method of claim 13, wherein the time-dilation memory provides the necessary structure to successfully fuse top-down analytics with bottom-up analytics into a single integrated system of human equivalent artificial intelligence.

17. A method for producing awareness through symbolic alignment with the user's neurology to trigger reactions that provide adaptations to the artificial brain's deterministic subconscious process, the system comprising:

display sensory perceptions comprising thalamic motion from prefrontal memory in its corresponding symbolic format to a user interface;

adjust display to generate awareness based on emotional variables and thought production comprising time-dilation memory from prefrontal memory;

align symbolic images with the neurology of the user's subconscious process;

adjust cognitive focus both by thought production and by user selection;

generate user awareness to encourage user action selection by altering symbols and cognitive focus;

process user action selection into short-term memory for indirect transfer into a motion translator software module;

search long-term memory for previous cognitive experiences stored in memory-chains of time-dilation memory; and sleep to transfer short-term memory to long-term memory and to reset the artificial brain.

18. The method of claim 17, wherein a cognitive object interface to a user's neurology establishes symbolic alignment by synchronizing visual symbols processed through an artificial subconscious process with neural symbols in the user's subconscious process creating a non-invasive bridge so the two systems function as one.

19. The method of claim 18, wherein a cognitive object interface generates awareness by organizing visual symbols modeled after eyesight with multiple levels including focus vision, peripheral vision, and subconscious vision where adjustments to the symbols on different levels generate user comprehension.

20. The method of claim 19, wherein a cognitive object interface produces an artificial reality so the user can comprehend millions of computer signals in real-time providing executive control to monitor, manage, train, and automate complex computer operations.

21. The method of claim 20, wherein a cognitive object interface can only produce action requests that must be sent through short-term memory wherein a separate subconscious system will execute the actions and monitor results thereby seamlessly connecting subconscious automation with conscious adaptation.

* * * * *